US010243285B2

United States Patent
Coteus et al.

(10) Patent No.: US 10,243,285 B2
(45) Date of Patent: Mar. 26, 2019

(54) LOW RESISTANCE, LOW-INDUCTANCE POWER CONNECTORS

(71) Applicant: International Business Machines Corporation, Armonk, NY (US)

(72) Inventors: Paul W. Coteus, Yorktown, NY (US); Andrew Ferencz, Southborough, MA (US); Shawn Anthony Hall, Pleasantville, NY (US); Todd Edward Takken, Brewster, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/856,295

(22) Filed: Dec. 28, 2017

(65) Prior Publication Data

US 2018/0138609 A1    May 17, 2018

Related U.S. Application Data

(63) Continuation of application No. 14/964,046, filed on Dec. 9, 2015, now Pat. No. 9,871,310.

(51) Int. Cl.
*H01R 12/52* (2011.01)
*H01R 4/70* (2006.01)
(Continued)

(52) U.S. Cl.
CPC ............. *H01R 12/52* (2013.01); *G06F 1/26* (2013.01); *H01R 4/70* (2013.01); *H01R 43/16* (2013.01); *H01R 12/62* (2013.01)

(58) Field of Classification Search
CPC .......... H01R 12/52; H01R 4/70; H01R 43/16; H01R 12/62
(Continued)

(56) References Cited

U.S. PATENT DOCUMENTS 4,149,764 A * 4/1979 Mattingly, Jr. ...... H01R 12/523
439/284
5,956,835 A * 9/1999 Aksu .................. G01R 1/07328
174/166 S
(Continued)

FOREIGN PATENT DOCUMENTS

DE   20 2013 000 123 U   5/2013
JP      2001043921 A     2/2001
WO   WO 009935725 A1    7/1999

OTHER PUBLICATIONS

United States Notice of Allowance dated Sep. 12, 2017 in U.S. Appl. No. 14/964,046.
(Continued)

*Primary Examiner* — Alexander Gilman
(74) *Attorney, Agent, or Firm* — Daniel P. Morris; McGinn IP Law Group, PLLC

(57) ABSTRACT

An electrical connector includes an anode for conducting an electrical supply current from a source to a destination, a cathode for conducting an electrical return current from the destination to the source, and an insulator that prevents electrical conduction between the anode and the cathode. The first and second shapes are such as to provide a conformity of one to the other, with the insulator placed therebetween and having a predetermined relatively thin thickness. A predetermined low-resistance path for the supply current is provided respectively by the anode and the cathode, and a proximity of the anode to the cathode along these paths provides a predetermined low self-inductance of the connector. The anode and the cathode each comprises a plurality of sections that are disposed at one or more predetermined angles to form a rigid assembly that accommodates a geometry between the source and the destination.

15 Claims, 22 Drawing Sheets

(51) Int. Cl.
*H01R 43/16* (2006.01)
*G06F 1/26* (2006.01)
*H01R 12/62* (2011.01)

(58) Field of Classification Search
USPC .......................................................... 439/61
See application file for complete search history.

(56) References Cited

U.S. PATENT DOCUMENTS

| | | | | | |
|---|---|---|---|---|---|
| 5,980,267 | A | * | 11/1999 | Ayers | H05K 7/1092 |
| | | | | | 439/60 |
| 6,290,514 | B1 | * | 9/2001 | McHugh | H01R 12/725 |
| | | | | | 439/108 |
| 6,618,268 | B2 | * | 9/2003 | Dibene, II | G06F 1/18 |
| | | | | | 174/261 |
| 6,623,279 | B2 | * | 9/2003 | Derian | G06F 1/18 |
| | | | | | 257/E23.088 |
| 7,033,084 | B2 | * | 4/2006 | Lappohn | G02B 6/3885 |
| | | | | | 385/73 |
| 8,678,838 | B2 | * | 3/2014 | Kim | H01R 13/20 |
| | | | | | 439/61 |
| 8,734,167 | B2 | * | 5/2014 | Aimoto | H01R 13/187 |
| | | | | | 439/74 |
| 8,994,483 | B2 | | 3/2015 | Dupraz et al. | |
| 9,019,063 | B2 | | 4/2015 | Ikriannikov | |
| 9,577,502 | B2 | | 2/2017 | Li et al. | |
| 9,871,310 | B2 | * | 1/2018 | Coteus | H01R 12/52 |
| 2002/0196614 | A1 | * | 12/2002 | DiBene, II | G06F 1/18 |
| | | | | | 361/803 |
| 2004/0043662 | A1 | * | 3/2004 | Abazaraia | H01R 13/719 |
| | | | | | 439/620.09 |
| 2004/0209518 | A1 | * | 10/2004 | Zhong | H01G 4/232 |
| | | | | | 439/620.09 |
| 2006/0039127 | A1 | * | 2/2006 | West | H02M 7/003 |
| | | | | | 361/803 |
| 2010/0015842 | A1 | * | 1/2010 | Zhang | H01R 13/6658 |
| | | | | | 439/374 |
| 2012/0051052 | A1 | * | 3/2012 | Wagatsuma | F21V 19/0025 |
| | | | | | 362/249.01 |
| 2017/0054125 | A1 | * | 2/2017 | Shaffer, II | H01M 10/0418 |

OTHER PUBLICATIONS

United States Office Action dated Jul. 14, 2017 in U.S. Appl. No. 14/964,046.
United States Office Action dated Mar. 30, 2017 in U.S. Appl. No. 14/964,046.
Kosai, Hiroyuki, et al. "Design and Performance Evaluation of a 200oC Interleaved Boost Converter." (2013).
Wood, Donald E., et al.; "High Performance, Low Impendence Power Interconnects." In Applied Power Electronics Conference and Exposition, 2003. APEXC'03.
Kasinski, K "Selected solutions in Printed Circuit Boards for silicon detector readout integrated circuits testing." In Mixed Design of Integrated Circuits and Systems (MIXDES), 2011 Proceedings of the 18th International Conference, pp. 507-510. IEEE, 2011.

* cited by examiner

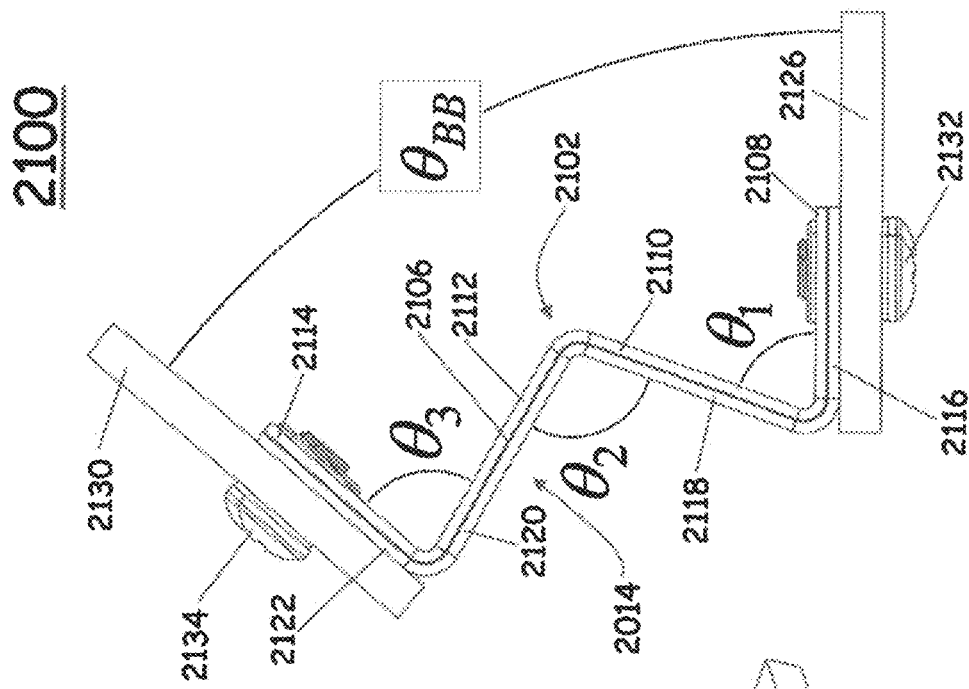
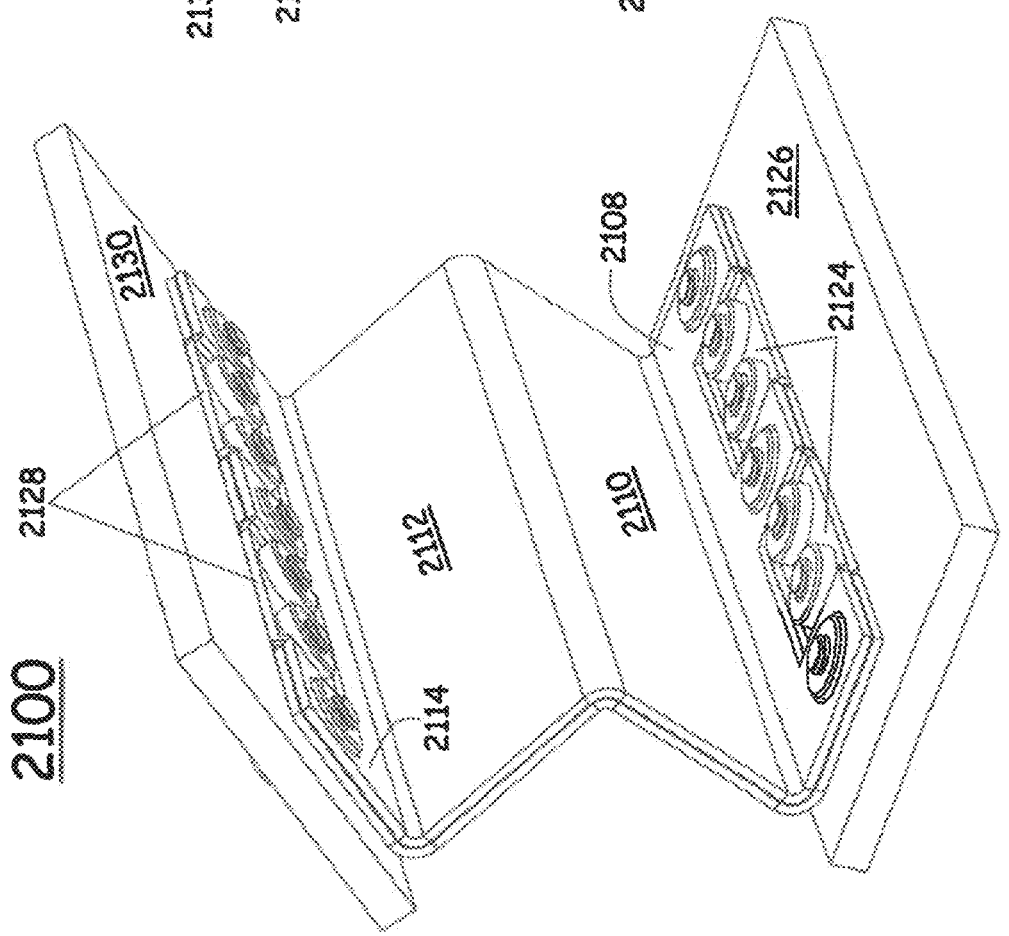

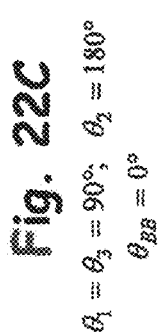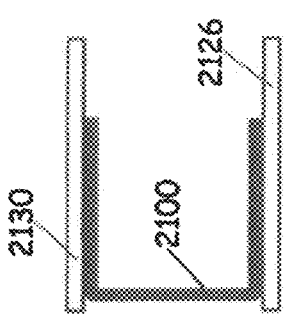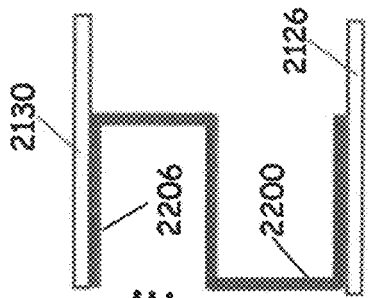
Fig. 22A
$\theta_1 = 90°; \theta_2 = \theta_3 = 180°$
$\theta_{BB} = 90°$
Fig. 22B
$\theta_1 = 90°; \theta_2 = \theta_3 = 270°$
$\theta_{BB} = 90°$
Fig. 22C
$\theta_1 = \theta_3 = 90°; \theta_2 = 180°$
$\theta_{BB} = 0°$
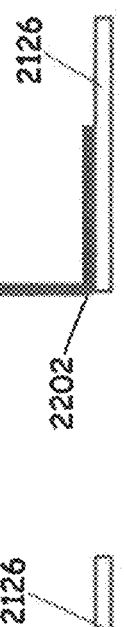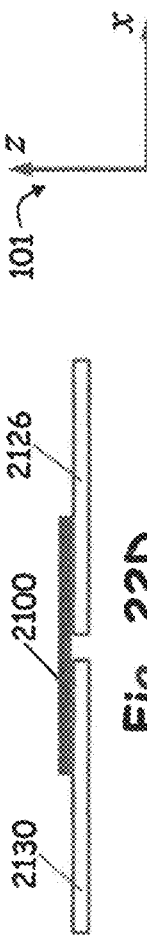
Fig. 22D
$\theta_1 = \theta_2 = \theta_3 = 180°$
$\theta_{BB} = 180°$
Fig. 22E

LOW RESISTANCE, LOW-INDUCTANCE POWER CONNECTORS

This Application is a Continuation Application of U.S. patent application Ser. No. 14/964,046, filed on Dec. 9, 2015.

FEDERALLY SPONSORED RESEARCH AND DEVELOPMENT

This invention was made with government support under contract B601996 awarded by the Department of Energy. The government has certain rights in the invention.

BACKGROUND

The present invention relates to separably interconnecting power between a DC power supply and its load with minimal losses even with clocking transitions on the load current demands. More specifically, a pair of conductive plates sized for predetermined current capacity and shaped to conform to each other are separated by a thin insulator to thereby minimize both resistive and self-inductive losses.

In the field of electronics, and in particular in the field of high-performance computers, it is highly desirable to reduce the consumption of electrical power as much as possible. Toward this end, new generations of power supplies are designed to minimize loss, and new generations of processors and memory systems are designed to dissipate less power despite higher computational performance. An effective technique in reducing the power consumption P of electronics is to lower its operating voltage V. For CMOS circuits, $P=CV^2f$, where C is the sum of all capacitances which are charged to voltage V or discharged from voltage V, at frequency f. As will be further explained, power is minimized by reducing V until any further reduction will stop the circuit from operating at frequency f. Yet, because $P=VI$, where I is current in amperes flowing through the electronics, reduced voltage V implies higher current I, despite reduction in power P. Thus, for such low-voltage, high-current electronics, a power connector must be capable of handling large current I. The current I must be delivered substantially at potential V from a supply terminal of the power supply to the electronics, and must be returned substantially at zero potential from the electronics to a return terminal of the power supply. The supply-terminal potential and the return-terminal potential may be referred to as "power" and "ground" respectively. Let $\Delta V_s$ be the voltage drop that occurs as current I travels from the supply terminal to the electronics; let $\Delta V_s$ be the voltage drop that occurs as current I travels from the electronics to the return terminal; and let $\Delta V_r$ be other overhead voltage drop that occurs, such as in conductors other than the connector. Let $R_s$, $R_r$, and $R_o$ be the resistances corresponding to the voltage drops $\Delta V_s$, $\Delta V_r$, and $\Delta V_o$ respectively; that is, $$\Delta V_s = IR_s; \Delta V_r = IR_r; \Delta V_o = IR_o. \quad (1)$$

A total overhead voltage drop $\Delta V_{total}$ may therefore be defined as $$\Delta V_{total} = \Delta V_s + \Delta V_r + \Delta V_o = I(R_s + R_r + R_o) \quad (2)$$

For electronics such as a processor and memory, another common method of power reduction is to reduce, as processor workload changes, the processor's operating voltage V and/or a clock frequency f at which the processor operates. A popular technique is called dynamic voltage-frequency scaling (DVFS), in which both V and f are dropped proportionally when workload is reduced, and raised again when workload is increased.

Consequently, the current I from the power supply to the processor and memory varies strongly in time. This leads to voltage fluctuation at the processor and memory, because an inductive voltage drop $\Delta V_L$ occurs across the power connector according to Faraday's Law, $$\Delta V_L = L\frac{dI}{dt}, \quad (3)$$

where L is a self-inductance of the power connector and $$\frac{dI}{dt}$$

is a change in current per unit time through the connector. Because a technique such as DVFS can produce large $$\frac{dI}{dt},$$

the self-inductance L of the power connector must be small, according to equation (3), to avoid large voltage fluctuations $\Delta V_L$.

Consequently, for low-voltage, high-current electronics, there is a need for a power connector that simultaneously achieves (a) high current-carrying capacity,
(b) low connector resistance $R_{conn} = R_s + R_r$, and
(c) low self-inductance $L_{conn}$.

Some prior-art, high-current power connectors achieve (a) and (b), but fail to achieve (c). For example, a power connector comprising an array of pins, with each pin being either power or ground, has relatively high self-inductance. Other prior-art connectors, such as coaxial or stripline connectors, achieve (c) but fail to achieve (a): they are typically restricted to just a few amperes of current per contact.

Thus, the present inventors have recognized that it is highly desirable to find a connector structure that achieves (a), (b), and (c) simultaneously, and does so in a compact package for the purpose of reducing $R_o$. For example, a useful target set of specifications might be:

$$I=100 \ A; R_{conn} = R_s + R_r \leq 50 \mu\Omega; L_{conn} \leq 500 \ pH, \quad (4)$$

where the inductance specification in (4) arises from a desire to achieve a dynamic voltage drop of at most $\Delta V_L = 50$ [mV] with $$\frac{dI}{dt} = 100\frac{A}{\mu s}.$$

Additionally, it would be particularly useful to have the connectors to be able to mate and unmate multiple times, meaning that the connectors are selectively easily separable.

SUMMARY

According to an embodiment of the present invention, an electrical connector is described that is capable of carrying large amounts of electrical current between two circuit boards or other entities, in both a forward direction and a reverse direction, in a manner that provides a low resistance between the two circuit boards in each of the two directions, and also provides a low self-inductance of the connector. The connector has application to delivering low-voltage, high-current power from a power supply on a first board to electronics on a second board: the low resistance minimizes voltage drop for a load current that is constant, while the low inductance minimizes voltage fluctuations due to a load current that changes. These issues are of great importance, for example, in designing high-performance computers.

In an exemplary embodiment, an electrical connector is described comprising
   a. An anode assembly for conducting an electrical supply current from a source to a destination, the anode assembly comprising an anode formed into a first shape from sheet metal or other sheet-like conducting material, an anode-to-source attachment means, and an anode-to-destination attachment means,
   b. A cathode assembly for conducting an electrical return current from the destination to the source, the cathode assembly comprising a cathode formed into a second shape from sheet metal or other sheet-like conducting material, a cathode-to-source attachment means, and a cathode-to-destination attachment means,
   c. An insulator that prevents electrical conduction between the anode and the cathode.

The first and second shapes are such as to provide a conformity of one to the other, with the insulator therebetween being relatively thin; the connector is attached to the source using both the anode-to-source attachment means and the cathode-to-source attachment means; and the connector is attached to the destination using both the anode-to-destination attachment means and the cathode-to-destination attachment means. In a preferred exemplary embodiment, for each of the anode assembly and the cathode assembly, at least one of the attachment means is separable even if the other is more permanent by using a press-fit or solder attachment. However, one of skill would readily recognize that the present invention is not limited by details of the attachment means, including the number of permanent/ separable attachments. In the exemplary embodiment described herein, all four end attachments (e.g., anode and cathode, source and destination) are separable. A low-resistance path for the supply current is thereby provided by the anode, a low-resistance path for the return current is thereby provided by the cathode, and the proximity of the anode to the cathode along these paths provides a low self-inductance of the connector, the proximity being afforded by the conformity of the first and second shapes.

In one or more embodiments, the connector deliberately sacrifices ease of connection and disconnection to achieve lower inductance and lower contact resistance. For example, in one or more embodiments, connection and disconnection involves tightening and loosening screws, respectively; nevertheless, separability of the connector, and therefore serviceability of the source and the destination, is maintained.

In one or more embodiments, the connector provides substantial mechanical compliance between source and destination, thereby permitting the use of a plurality of the connectors in parallel between the source and the destination without fear that electrical contact at either the source or the destination will be compromised by mechanical tolerances.

BRIEF DESCRIPTION OF THE DRAWINGS

FIG. 21A illustrates a perspective view of a power connector 2100 according to a fifth exemplary embodiment;

FIG. 21B illustrates a cross-sectional view of the power connector 2100, which has angle parameters $\theta_1$, $\theta_2$, and $\theta_3$;

FIG. 22A illustrates a cross-sectional schematic view of the power connector 2100 with $\theta_1=90°$, $\theta_2=180°$, and $\theta_3=180°$;

FIG. 22B illustrates a cross-sectional schematic view of the power connector 2100 with $\theta_1=90°$, $\theta_2=270°$, and $\theta_3=270°$;

FIG. 22C illustrates a cross-sectional schematic view of the power connector 2100 with $\theta_1=90°$, $\theta_2=180°$, and $\theta_3=90°$;

FIG. 22D illustrates a cross-sectional schematic view of the power connector 2100 with $\theta_1=180°$, $\theta_2=180°$, and $\theta_3=180°$; and FIG. 22E illustrates a cross-sectional schematic view of a power connector 2200.

REFERENCE NUMERALS

Figure 1:
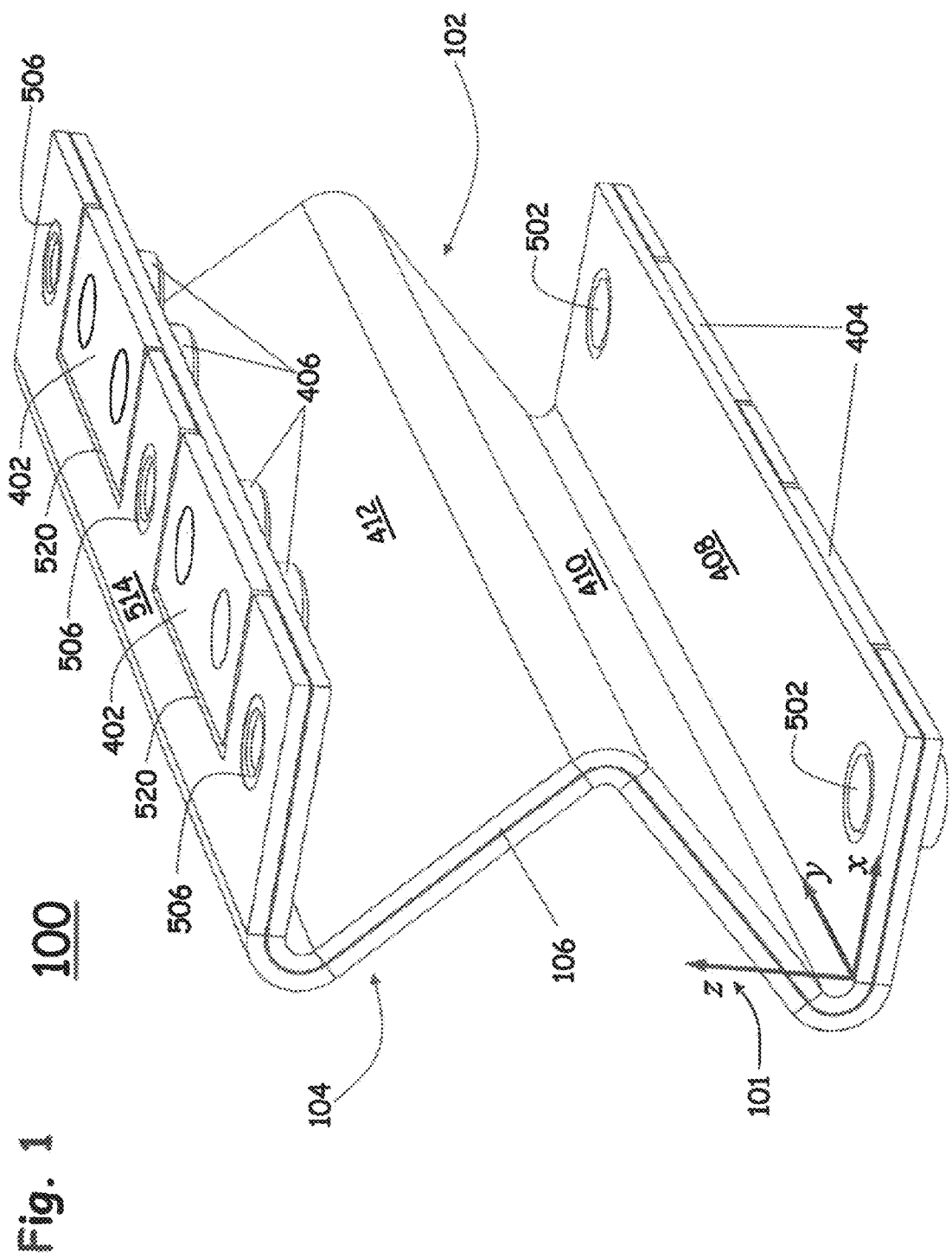
FIG. 1 illustrates a top perspective view of a power connector 100 according to a first exemplary embodiment.

In the following listing of component labels, the leading digit(s) of a reference numeral indicates the number of the figure whose discussion introduces it. For example, although reference numeral 402 appears on FIG. 1, it is introduced during the discussion of FIG. 4, so the leading digit is "4".

Figure 13:
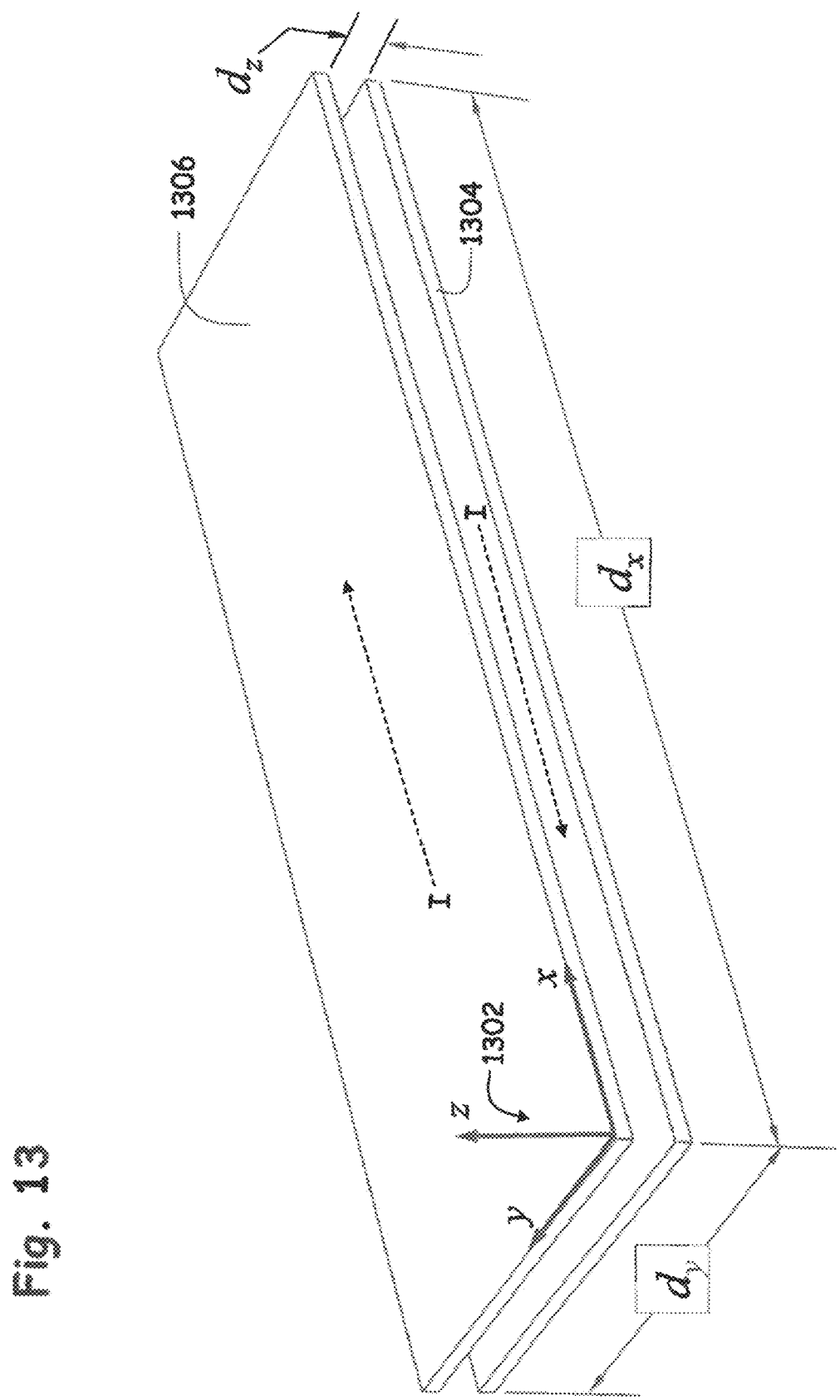
FIG. 13 illustrates nomenclature used in the calculation of inductance for two parallel plates.

100 High-current, low-resistance, low-inductance connector according to a first embodiment
101 Cartesian coordinate system
102 Anode assembly for connector 100
104 Cathode assembly for connector 100
106 Insulator for connector 100
302 Coating on cathode 500 that obviates need for insulator 106
304 Coating on anode 400 that obviates need for insulator 106
400 Anode for connector 100
402 Top shim plate
404 Bottom shim plate
406 Fasteners in top flange 414 of anode 400
408 Bottom flange of anode 400
410 First angled flange of anode 400
412 Second angled flange of anode 400
414 Top flange of anode 400
416 Fastener hole
418 Fastener clearance hole
420 Locating-pin clearance hole
422 Fastener clearance hole
500 Cathode for connector 100
502 Locating Pin
506 Fastener in flange 518 of cathode 500
508 Bottom flange of cathode 500
510 First angled flange of cathode 500
512 Second angled flange of cathode 500
514 Top flange of cathode 500
516 Fastener hole
518 Top notch
520 Gap between cathode top flange and anode top shim plate
522 Bottom notch
524 Gap between cathode bottom flange and anode bottom shim plate
526 Hole in cathode for locating pin
528 Protruding portion of cathode top flange 514
530 Protruding portion of cathode bottom flange 508
608 Bottom portion of insulator 106
610 First angled portion of insulator 106
612 Second angled portion of insulator 106
614 Top portion of insulator 106
616 Fastener clearance hole
618 Top notch
620 Locating-pin clearance hole
622 Bottom notch
628 Protruding portion of top portion 614
630 Protruding portion of bottom portion 608
702 Sigma-shaped curve
800 Two-connector, board-to-board assembly
802 First printed circuit board
804 Second printed circuit board
902 Locating-pin holes in second circuit board 804 for a first instance 100.1 of connector 100
904 Anode pads on second circuit board 804 for the first instance 100.1 of connector 100
906 Cathode pad on second circuit board 804 for the first instance 100.1 of connector 100
908 Locating-pin holes in second circuit board 804 for a second instance 100.2 of connector 100
910 Anode pads on second circuit board 804 for the second instance 100.2 of connector 100
912 Cathode pad on second circuit board 804 for the second instance 100.2 of connector 100
1002 Fasteners that engage fasteners 406 of the first instance 100.1 of connector 100
1004 Fasteners that engage fasteners 506 of the first instance 100.1 of connector 100
1006 Anode pads on first circuit board 802 for the first instance 100.1 of connector 100
1008 Cathode pad on first circuit board 802 for the first instance 100.1 of connector 100
1010 Fasteners that engage fasteners 406 of the second instance 100.2 of connector 100
1012 Fasteners that engage fasteners 506 of the second instance 100.2 of connector 100
1014 Anode pads on first circuit board 802 for the second instance 100.2 of connector 100
1016 Cathode pad on first circuit board 802 for the second instance 100.2 of connector 100
1100 Three-connector, board-to-board assembly
1202 Short vertical path at top of connector 100
1204 Short vertical path at bottom of connector 100
1302 Coordinate system for FIG. 13
1304 First parallel plate
1306 Second parallel plate
1400 High-current, low-resistance, low-inductance connector according to a second embodiment
1402 Anode assembly of connector 1400
1404 Gap between anode surface stamp and cathode for connector 1400
1600 Anode for connector 1400
1608 Bottom flange of anode 1600
1610 First angled flange of anode 1602
1612 Second angled flange of anode 1602
1614 Top flange of anode 1602
1616 Surface stamp in top flange 1614 of anode 1600
1618 Surface stamp in bottom flange 1608 of anode 1600
1800 High-current, low-resistance, low-inductance connector according to a third embodiment
1802 All-fastener-mounted anode assembly of connector 1800
1804 All-fastener-mounted cathode assembly of connector 1800
1806 All-fastener-mounted anode for connector 1800
1808 Female fastener attached to a top surface stamp 1810
1810 Top surface stamp
1812 Female fastener attached to a bottom surface stamp 1814
1814 Bottom surface stamp
1816 All-fastener-mounted cathode
1818 Female fastener attached to a top cathode flange 1820
1820 Top cathode flange
1822 Female fastener attached to a bottom cathode flange 1824
1824 Bottom cathode flange
1826 Centerline of connector assembly, parallel to xy plane
1900 Board-to-board assembly using connector 1800
1902 First printed circuit board in assembly 1900
1904 Second printed circuit board in assembly 1900
1908 Male fastener that engages female fastener 1808
1912 Male fastener that engages female fastener 1812
1918 Male fastener that engages female fastener 1818
1922 Male fastener that engages female fastener 1822
2000 High-current, low-resistance, low-inductance connector according to a fourth embodiment
2100 High-current, low-resistance, low-inductance connector according to a fifth embodiment 2102 Anode for connector 2100
2104 Cathode for connector 2100
2106 Insulating layer for connector 2100
2108 Bottom flange of anode 2102
2110 First angled flange of anode 2102
2112 Second angled flange of anode 2102
2114 Top flange of anode 2102
2116 Bottom flange of cathode 2104
2118 First angled flange of cathode 2104
2120 Second angled flange of cathode 2104
2122 Top flange of cathode 2104
2124 Surface stamp in bottom flange 2108 of anode 2102
2126 First circuit board
2128 Surface stamp in top flange 2114 of anode 2102
2130 Second circuit board
2132 Fasteners for first circuit board 2126
2134 Fasteners for second circuit board 2130
2202 First corner
2204 Second corner
2206 Third angled flange

DETAILED DESCRIPTION

With reference now to the figures, various non-limiting exemplary embodiments will now be described.

First Exemplary Embodiment (FIGS. 1-13)

Figure 2:
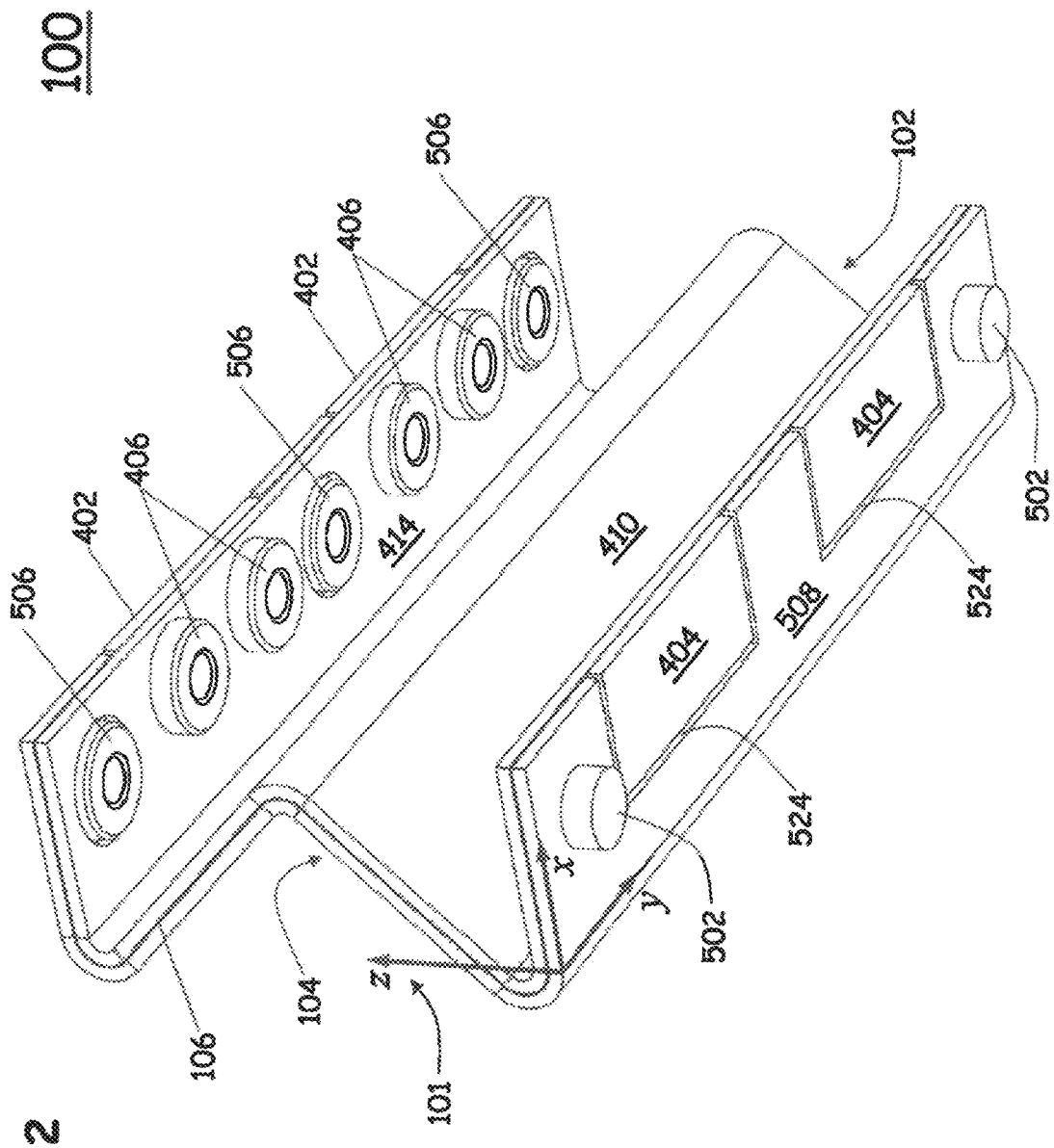
FIG. 2 illustrates a bottom perspective view of the power connector 100.
Figure 3:
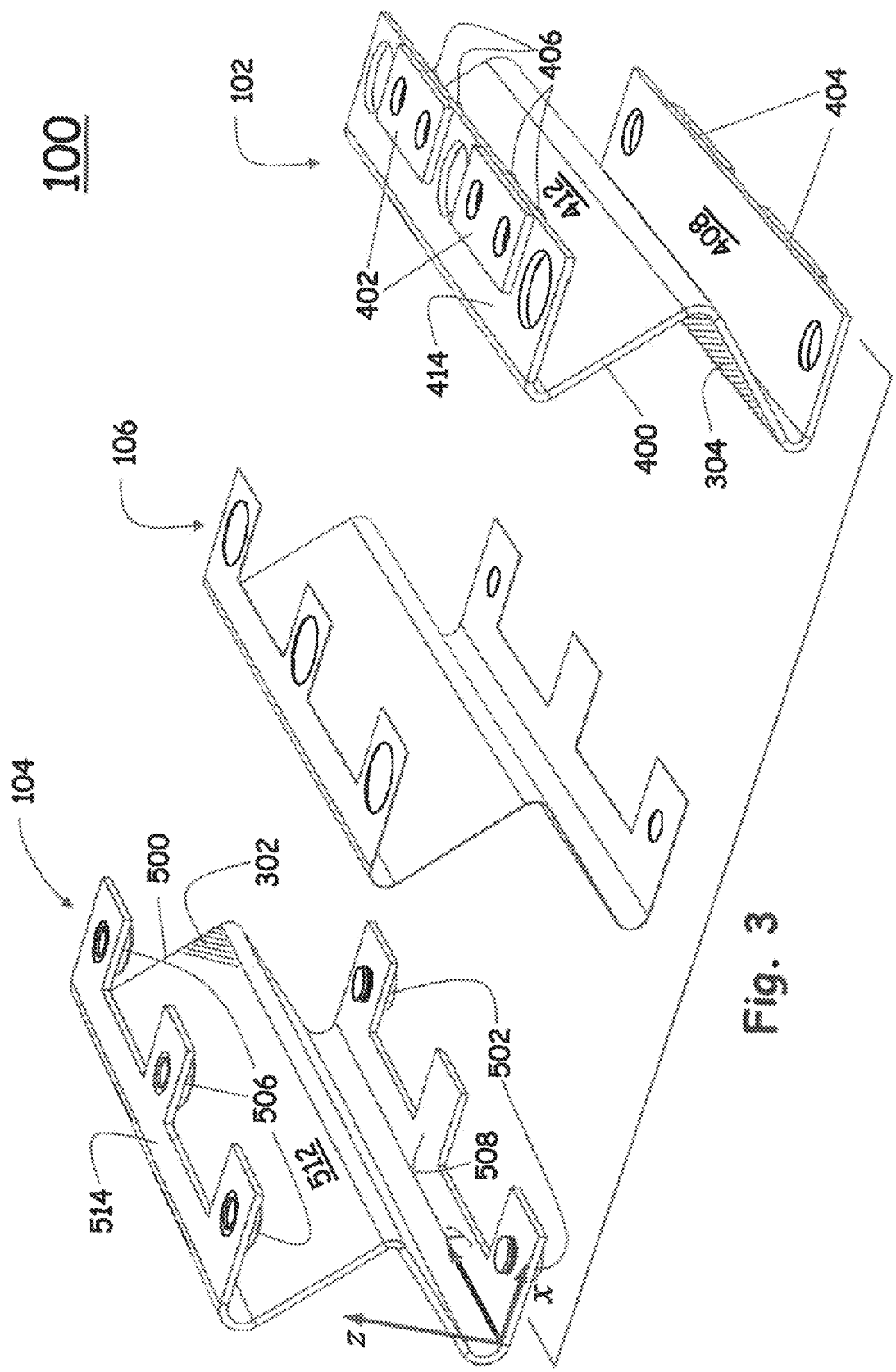
FIG. 3 illustrates an exploded view of the power connector 100.
Figure 5:
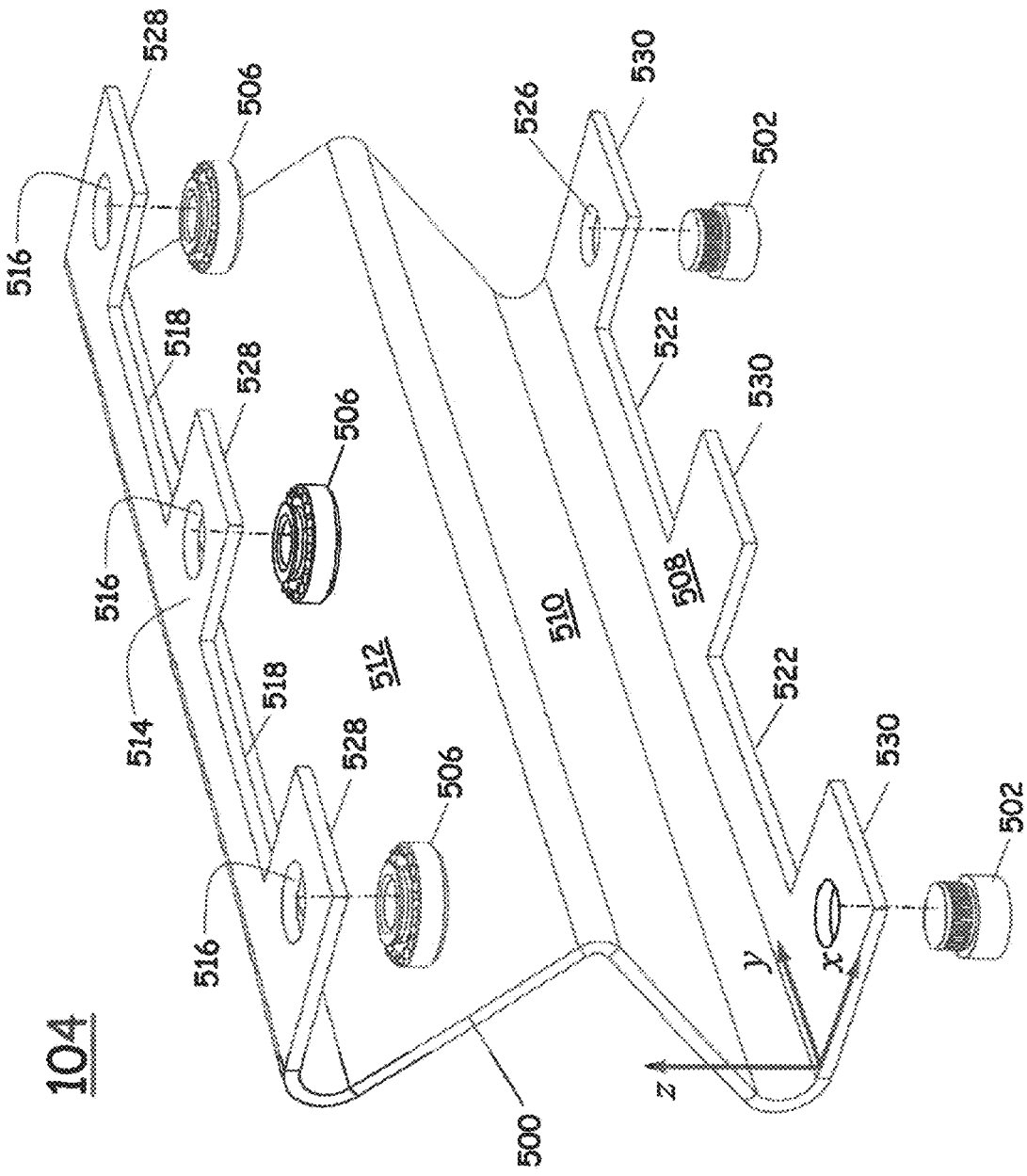
FIG. 5 illustrates an exploded view of a cathode assembly 104 for the power connector 100.
Figure 6:
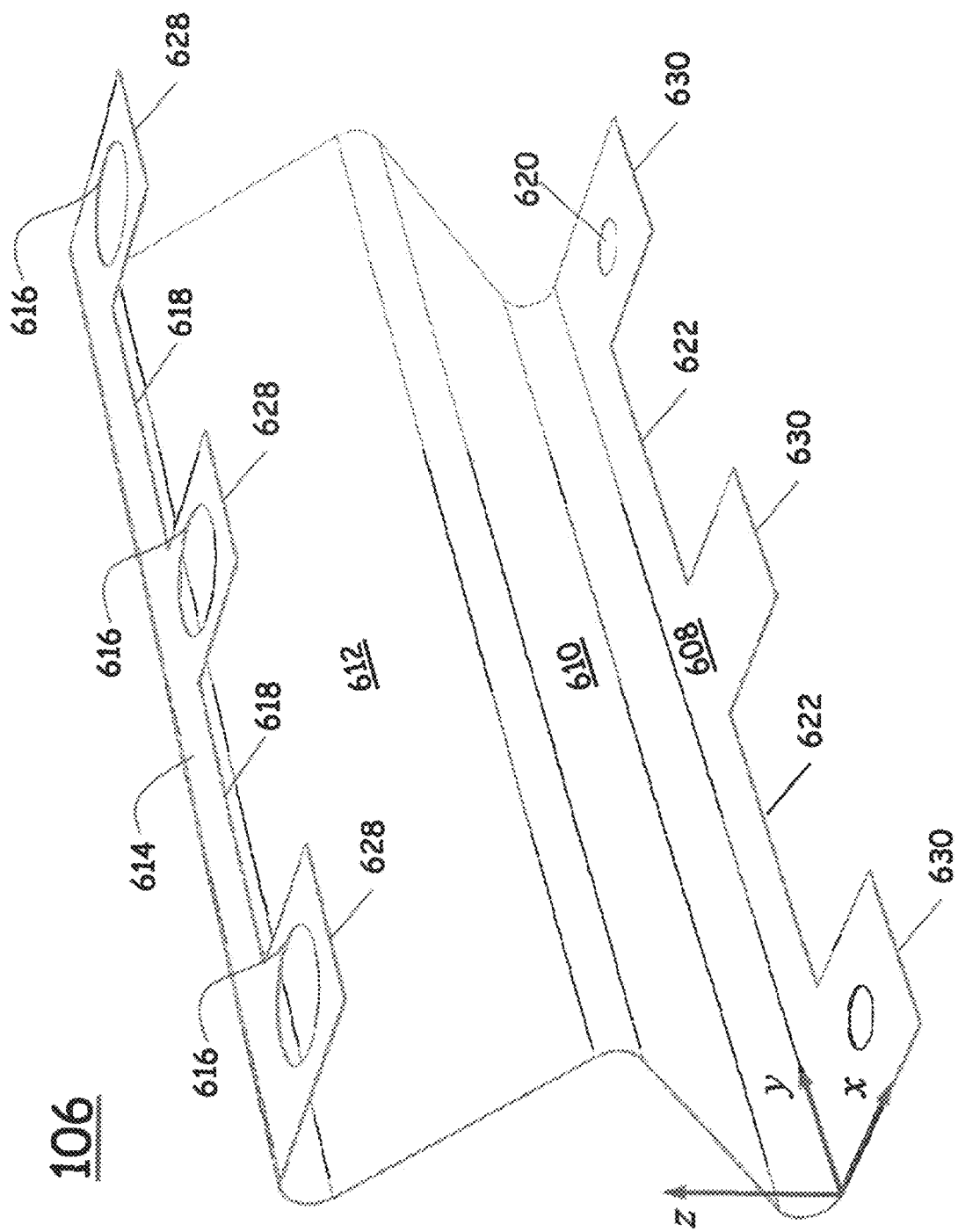
FIG. 6 illustrates an insulator for the power connector 100.
Figure 7:
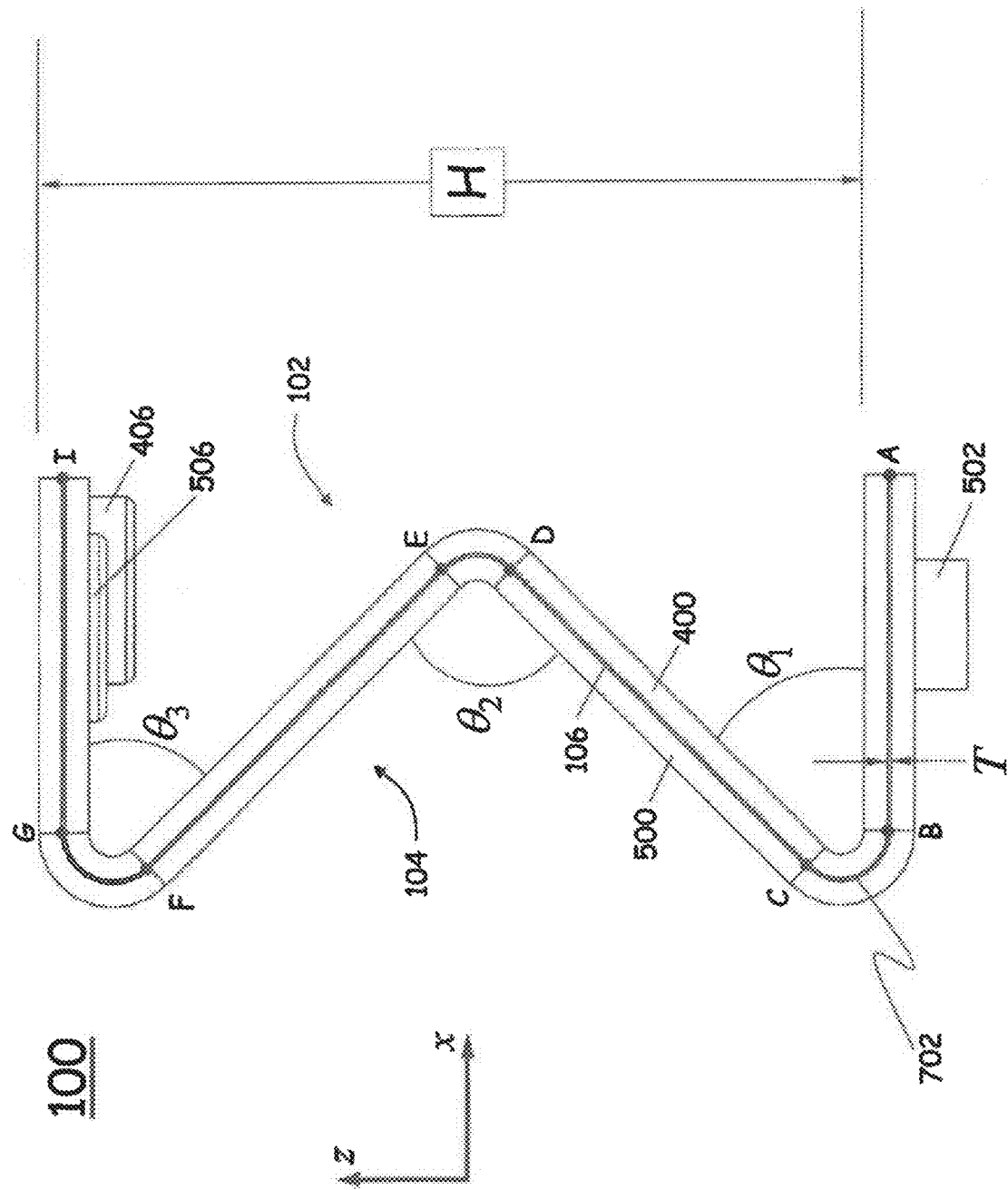
FIG. 7 illustrates a cross-sectional view of the power connector 100.

FIG. 1 through FIG. 7 illustrate a first embodiment of a high-current-capacity, low-resistance, low-inductance electrical connector 100. Each figure shows an imaginary, Cartesian xyz coordinate system 101 comprising an x axis, ay axis and a z axis, the coordinate system thereby defining an xy plane, an xz plane and a yz plane. The coordinate system's orientation with respect to the connector is consistent on all figures, although the origin is not necessarily consistent. FIGS. 1, 2, and 7 illustrate assembled views of the connector 100, which comprises an anode assembly 102, a cathode assembly 104, and an insulator 106. These three assemblies are illustrated on FIG. 3, which is an exploded diagram of the connector 100. Other reference numerals on FIGS. 1 through 3 are described in connection with FIGS. 4 through 6.

Figure 4:
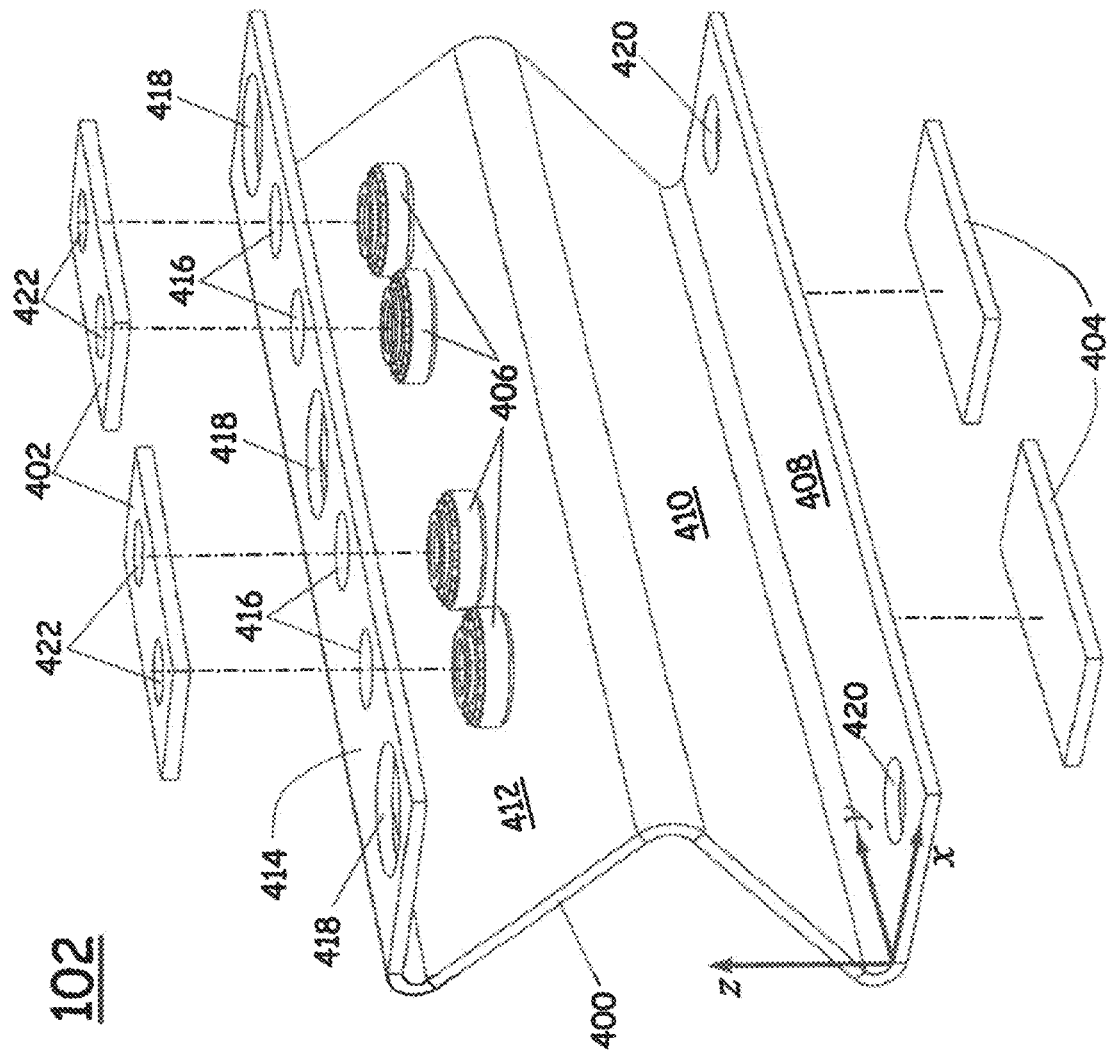
FIG. 4 illustrates an exploded view of an anode assembly 102 for the power connector 100.

FIG. 4 illustrates an exploded view of the anode assembly 102, which comprises an anode 400, at least one top shim plate 402, at least one bottom shim plate 404, and at least one anode fastener 406, such as a threaded PEM nut, well known in the art, available from Penn Engineering® of Danboro, Pa. However, one of ordinary skill in the art would readily recognize that other separable fastening means could be used other than PEM nuts and screws, such as slide-in or plug connectors or that the fastening means could be more permanent, such as press-fit or soldered connections, as long as the connector maintains sufficient mechanical compliance and the low resistance objectives are met. The anode 400, the top shim plates 402, and the bottom shim plates 404 are made of electrically conducting material, preferably copper or alloys of copper such as copper beryllium. The anode 400 comprises a bottom flange 408, a first angled flange 410, a second angled flange 412, and a top flange 414. The top flange 414 comprises, for each anode fastener 406, a fastener hole 416 for receiving the anode fastener 406 and affixing it to the top flange 414. The top flange 414 also comprises at least one fastener-clearance hole 418. The bottom flange 408 comprises two locating-pin clearance holes 420.

Each top shim plate 402 comprises at least one screw-clearance hole 422. Each top shim plate is affixed to the positive-z-facing surface of top flange 414 in such a manner that the screw-clearance holes 422 are substantially concentric with the fastener holes 416, and such that a low electrical resistance is achieved between each top shim plate 402 and the top flange 414. The bottom shim plates 404 are affixed to the negative-z-facing surface of bottom flange 408 in such a manner that a low electrical resistance is achieved therebetween. The top and bottom shim plates are attached, for example, by soldering or brazing. The anode fasteners 406 are attached, for example, by swaging, as is routinely done in the attachment of PEM nuts.

FIG. 5 illustrates an exploded view of the cathode assembly 104, which comprises a cathode 500, two locating pins 502, and at least one cathode fastener 506 such as a threaded PEM nut. The cathode 500 is made of electrically conducting material, such as copper. The cathode 500 comprises a bottom flange 508, a first angled flange 510, a second angled flange 512 and a top flange 514. The top flange 514 comprises, for each cathode fastener 506, a fastener hole 516 for receiving the cathode fastener 506 and affixing it to the top flange 514 by, for example, swaging. The top flange 514 also comprises at least one top notch 518, each of which accommodates, in the assembly 100, the top shim plate 402; as illustrated in FIG. 1, the top notch 518 is large enough to leave a gap 520 between the cathode's top flange 514 and three sides of the anode's top shim plate 402.

Likewise, referring again to FIG. 5, the bottom flange 508 comprises at least one bottom notch 522, each of which accommodates, in the assembly 100, the bottom shim plate 404; as illustrated on FIG. 2, each bottom notch 522 is large enough to leave a gap 524 between the bottom flange 508 and three sides of the bottom shim plate 404. The bottom flange 508 also comprises two locating-pin holes 526, which are used to attach the locating pins 502 thereto by, for example, swaging. Protruding portions 528 of the top flange 514 are formed by the notches 518; likewise, protruding portions 530 of the bottom flange 508 are formed by the notches 522.

FIG. 6 illustrates the insulator 106, which comprises a bottom portion 608, a first angled portion 610, a second angled portion 612, and a top portion 614. The top portion 614 comprises, for each cathode fastener 506, a fastener clearance hole 616. The top portion 614 also comprises, for each top notch 518, a corresponding notch 618. The bottom portion 608 comprises two locating-pin clearance holes 620, and, for each bottom notch 522, a corresponding bottom notch 622. Protruding portions 628 of the top portion 614 are formed by the notches 618; likewise, protruding portions 630 of the bottom portion 608 are formed by the notches 622.

Referring to FIG. 3, it should be noted that the insulator 106 may not actually be a separate piece; instead, it may be pre-bonded as a first coating 302 applied to the following surfaces of the cathode 500: the negative-z-facing surface of flange 514, the positive-x-facing surfaces of flanges 512 and 510, and the positive-z-facing surface of flange 508. As a second alternative, insulator 106 may be pre-bonded as a second coating 304 applied to the following surfaces of the anode 400: the positive-z-facing surface of flange 414, the negative-x-facing surfaces of flanges 412 and 410, and the negative-z-facing surface of flange 408. As a third alternative, insulator 106 may be provided by applying both coatings 302 and 304.

FIG. 7 illustrates a cross-sectional view of the connector assembly 100, parallel to the xz plane. As shown, the anode 102, the cathode 104 and the insulator 106 conform to each other everywhere along a sigma-shaped curve 702 comprising points A, B, C, D, E, F, G, and I; consequently, everywhere along the sigma-shaped curve 702, the anode and cathode are separated only by a thickness T of the insulator.

Assuming that one or both of the pre-bonded coatings 302 and 304 are used to provide the insulator 106, assembly of the connector 100 merely involves nesting the anode assembly 102 inside the cathode assembly 104. To accomplish this, protrusions 528 (FIG. 5) must be temporarily and elastically bent upward to allow the fasteners 506 to snap into the fastener-clearance holes 418. Each fastener-clearance 418 hole is larger than the fastener 506 by a significant amount, in order to avoid electrical shorting of anode to cathode, so this assembly process is relatively easy to perform. To insure the proximity of anode to cathode shown in FIG. 7, it is desirable, during this assembly process, to apply a small quantity of adhesive to the insulator-coated surfaces of the anode and the cathode.

The thickness of the top shim plates 402 is chosen so that, when assembly of the connector is complete, the positive-z-facing surfaces of the top shim plates 402 are substantially co-planar with the positive-z-facing surface of the top flange 514. Likewise, the thickness of the bottom shim plates 404 is chosen so that, when assembly of the connector is complete, the negative-z-facing surfaces of the bottom shim plates 404 are substantially co-planar with the negative-z-facing surface of the bottom flange 508.

Figure 8:
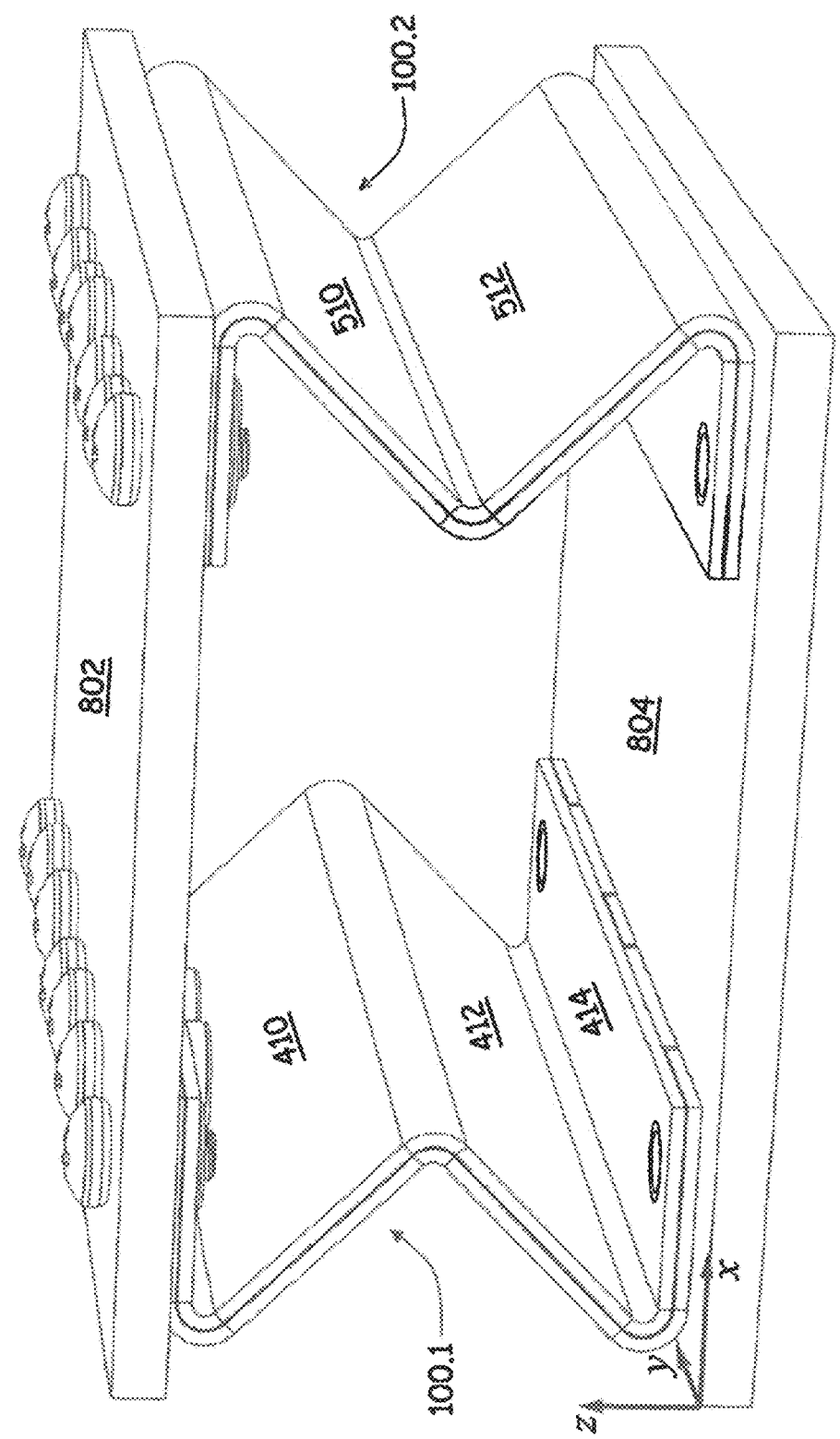
FIG. 8 illustrates a perspective view of an assembly 800 comprising two circuit boards and two instances of the power connector 100.

Referring to FIG. 8, connector 100 is designed to conduct a first voltage V on the anode 400 and a second voltage $V_{ref}$ on the cathode 500, thereby to deliver electrical power from a first printed circuit board (PCB) 802, which is in contact with the anode at upper shim plates 402 and is in contact with the cathode at the top flange 514, to a second PCB 804, which is in contact with the anode at the lower shim plates 404 and is in contact with the cathode at the bottom flange 508.

For example, V may be a positive voltage (V>0) associated with a positive terminal of a power domain, and $V_{ref}$ may be a ground potential ($V_{ref}=0$) associated with a negative terminal of the power domain. The insulator 106, which is composed of an electrically insulating material, maintains electrical isolation between the anode and the cathode, thereby preventing voltage V from shorting to voltage $V_{ref}$.

FIG. 8 illustrates a two-connector, board-to-board assembly 800. This is a typical deployment of the connector assembly 100, in which two instances thereof, denoted 100.1 and 100.2, are used. Connector 100.1 transmits a first power domain, characterized by its anode-voltage $V_1$, from the first PCB 802, where voltage $V_1$ is generated, to the second PCB 804, where voltage $V_1$ is used to power various electronic devices. Likewise, connector 100.2 transmits a second power domain, characterized by its anode-voltage $V_2$ from the first PCB 802, where voltage $V_1$ is generated, to the second PCB 804, where voltage $V_2$ is used.

Figure 9:
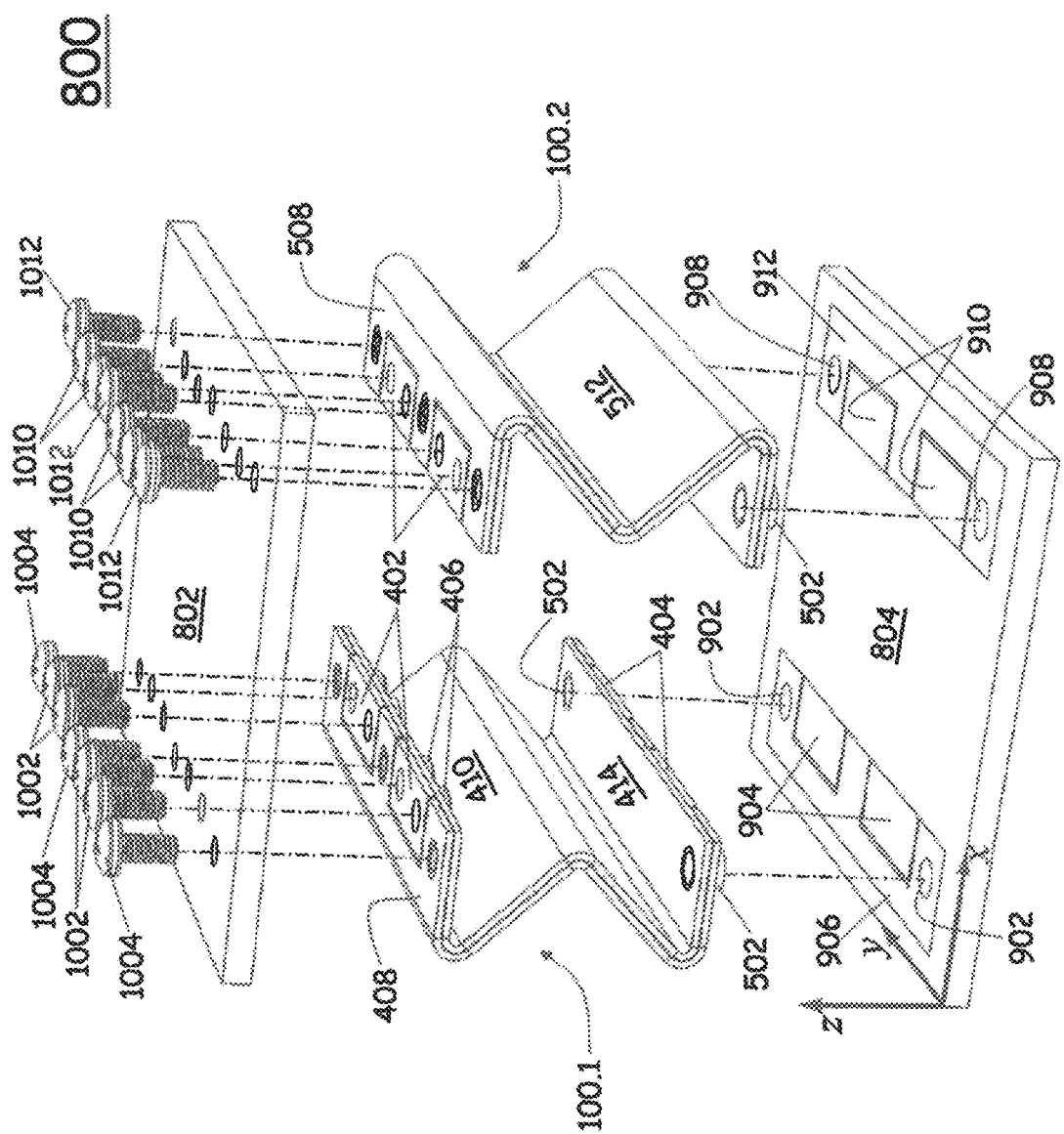
FIG. 9 illustrates an exploded view of the assembly 800.

FIG. 9 is an exploded diagram of assembly 800 that illustrates an attachment of connectors 100.1 and 100.2 to PCB 804. Locating connector 100.1 with respect to PCB 804 by insertion of its locating pins 502 into holes 902, the connector 100.1 is soldered to an inner surface of PCB 804 using copper pads 904 and 906 printed thereon; specifically, to connect the anode of connector 100.1 to PCB 804, the bottom shim plates 404 of connector 100.1 are soldered to the copper pads 904, and to connect the cathode of connector 100.1 to PCB 804, the bottom flange 508 of connector 100.1 is soldered to the copper pad 906. Likewise, locating connector 100.2 with respect to PCB 804 by insertion of its locating pins 502 into holes 908, the connector 100.2 is soldered to the inner surface of PCB 804 using copper pads 910 and 912 printed thereon; specifically, to connect the anode of connector 100.2 to PCB 804, the bottom shim plates 404 of connector 100.2 are soldered to the copper pads 910, and to connect the cathode of connector 100.2 to PCB 804, the bottom flange 508 of connector 100.2 is soldered to the copper pad 912.

Figure 10:
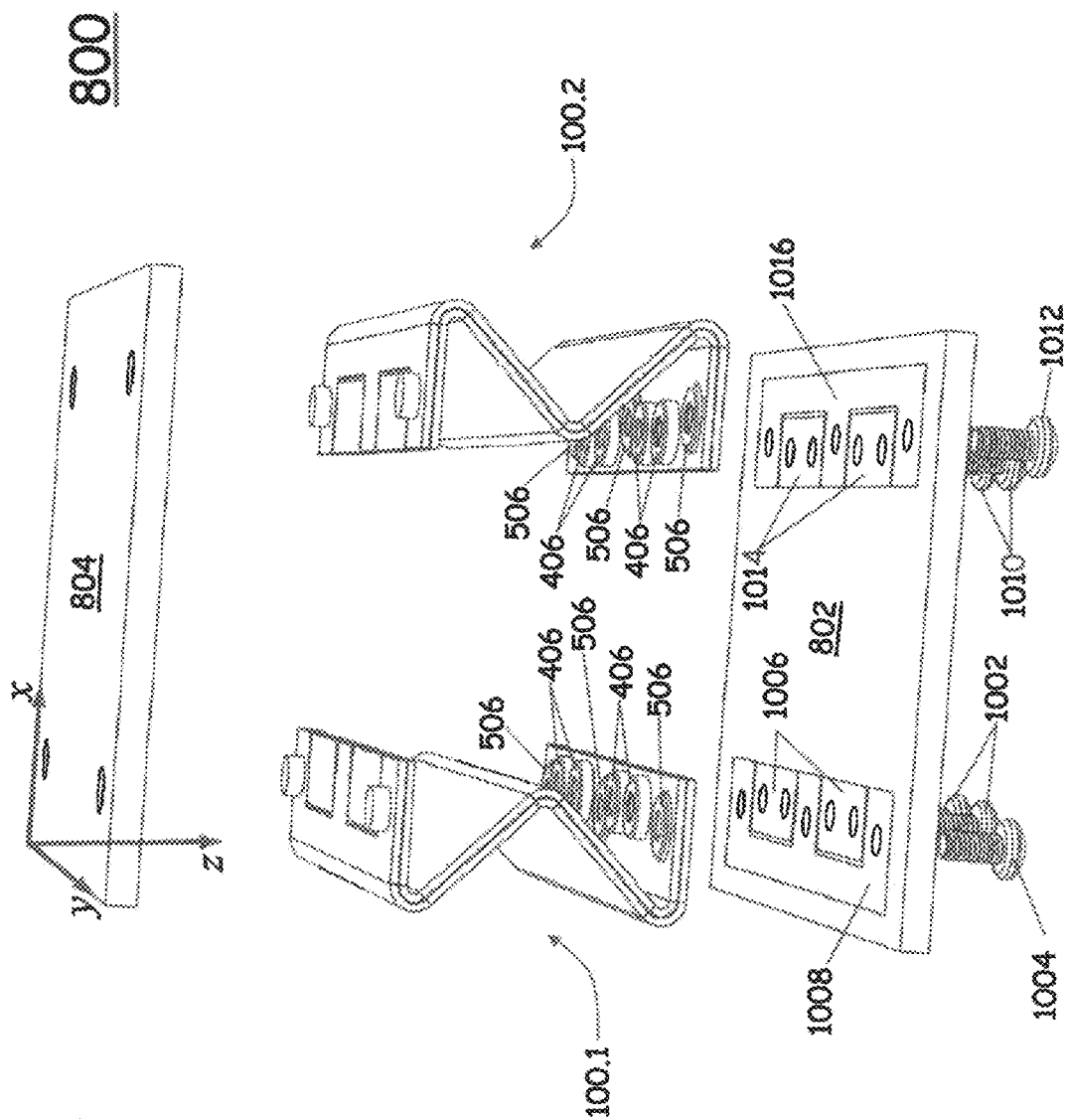
FIG. 10 illustrates an upside-down exploded view of the assembly 800.

FIG. 10 is an upside-down exploded diagram of assembly 800 that illustrates an attachment of connectors 100.1 and 100.2 to PCB 802. Specifically, the attachment of connector 100.1 to PCB 802 is achieved with fasteners 1002 and 1004 that engage fasteners 406 and 506 of connector 100.1, respectively. Tightening the fasteners 1002 achieves a low-resistance anode connection for connector 100.1 by pulling the top shims 402 thereof with high normal force against copper pads 1006. Tightening the fasteners 1004 achieves a low-resistance cathode connection for connector 100.1 by pulling the top flange 414 thereof with high normal force against a copper pad 1008.

Likewise, the attachment of connector 100.2 to PCB 802 is achieved with fasteners 1010 and 1012 that engage fasteners 406 and 506 of connector 100.2, respectively. Tightening the fasteners 1010 achieves a low-resistance anode connection for connector 100.2 by pulling the top shims 402 thereof with high normal force against copper pads 1014. Tightening the fasteners 1012 achieves a low-resistance cathode connection for connector 100.2 by pulling the top flange 514 thereof with high normal force against a copper pad 1016.

Still referring to FIG. 10, the attachment of connectors 100.1 and 100.2 to PCB 802 with removable fasteners 1002, 1004, 1110, and 1012 is advantageous because PCBs 802 and 804 may then be separated for servicing. For example, if a power-delivery component on PCB 802 fails, replacement of PCB 802 is thereby facilitated, because the fasteners 1002, 1004, 1010, and 1012 may be easily removed, a new PCB 802 inserted, and the fasteners re-attached.

Figure 11:
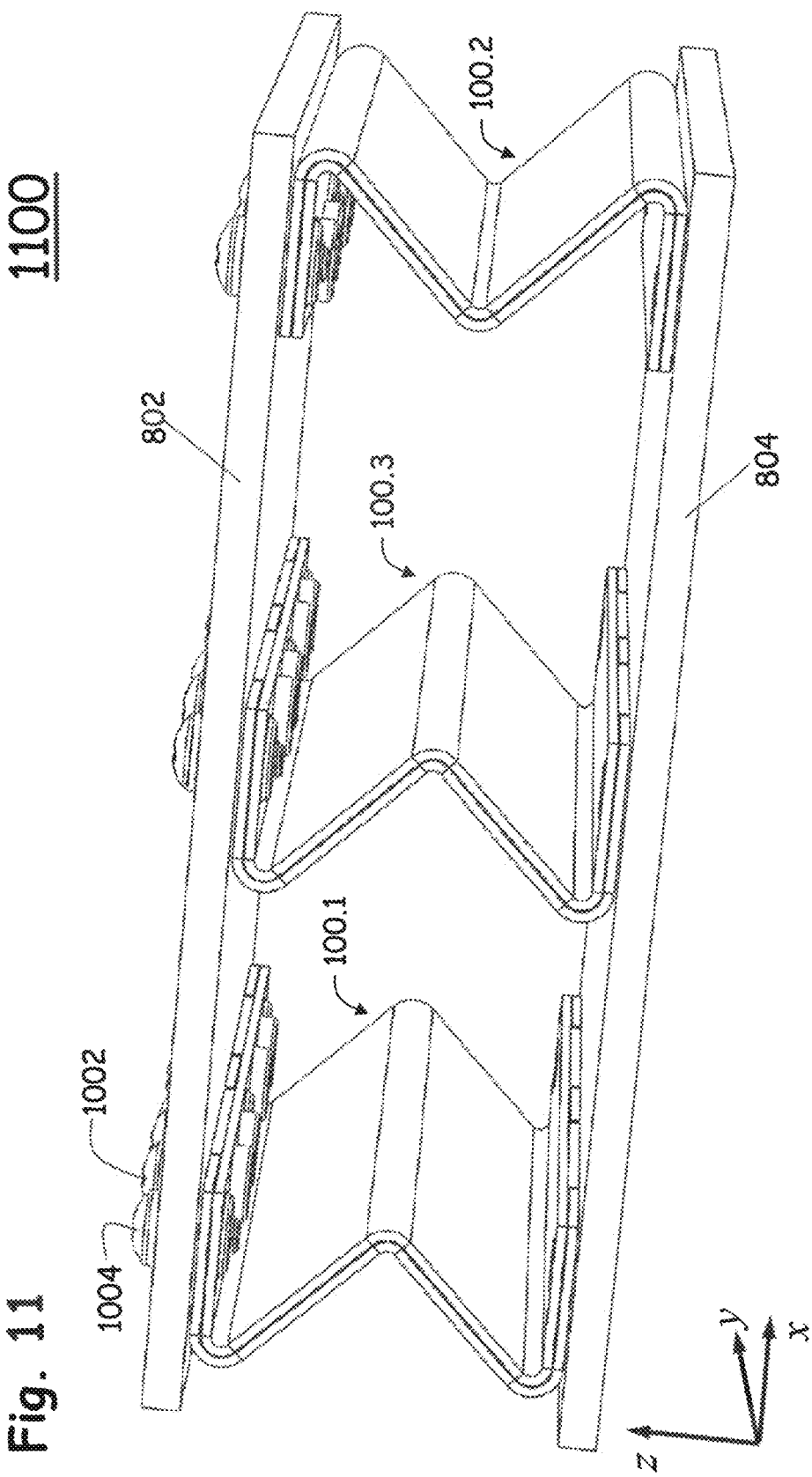
FIG. 11 illustrates a perspective view of an assembly 1100 comprising two circuit boards and three instances of the power connector 100.

FIG. 11 illustrates a three-connector, board-to-board assembly 1100. It is similar to assembly 800 except that a third instance of connector assembly 100, denoted 100.3, is added for the purpose of transmitting a third power domain from PCB 802 to PCB 804. In such a case, where there are three or more instances of connector assembly 100 between the two PCBs, compliance in the z-direction is desirable in connector assembly 100, to allow for mechanical tolerances where a connector height H, shown in FIG. 7, may differ from instance to instance of the connector.

For example, suppose that the heights of instances 100.1, 100.2 and 100.3 are $H_1$, $H_2$ and $H_3$ respectively. If $H_2=H_1$ but $H_3>H_1$, then as the fasteners such as 1002 and 1004 are tightened for all three connectors 100.1, 100.2 and 100.3, PCBs 802 and 804 will bend toward each other at connectors 100.1 and 100.2, which will be in tension, while connector 100.3 will be in compression. Consequently, solder joints at PCB 804 for 100.1 and 100.2 will be under tension. Excessive tension is undesirable, as it may lead to solder-joint failure. To avoid excessive tension as well as excessive deformation of the PCBs, it is therefore desirable that the connector assembly 100 be compliant in the z direction. This is the reason for the cross-sectional shape of the connector 100, like an upper-case Greek "sigma", shown most clearly in FIG. 7.

Referring to this figure, when a sigma-shaped connector is placed in compressed or tension, it flexes around the corners BC, DE, and FG, thereby allowing modulation of the height H and relieving the stress that would accrue for a simpler shape. For example, referring to FIG. 7, if $\theta_1=\theta_3=90°$ and $\theta_2=180°$, then the connector has a "C" shape; that is the two angled flanges merge into a vertical flange. Such a C shape has less compliance than the sigma shape, because the vertical flange must buckle before it deflects, which implies a greater stress on solder joints, stress that may be problematic if the tolerance on H is appreciable.

Figure 12:
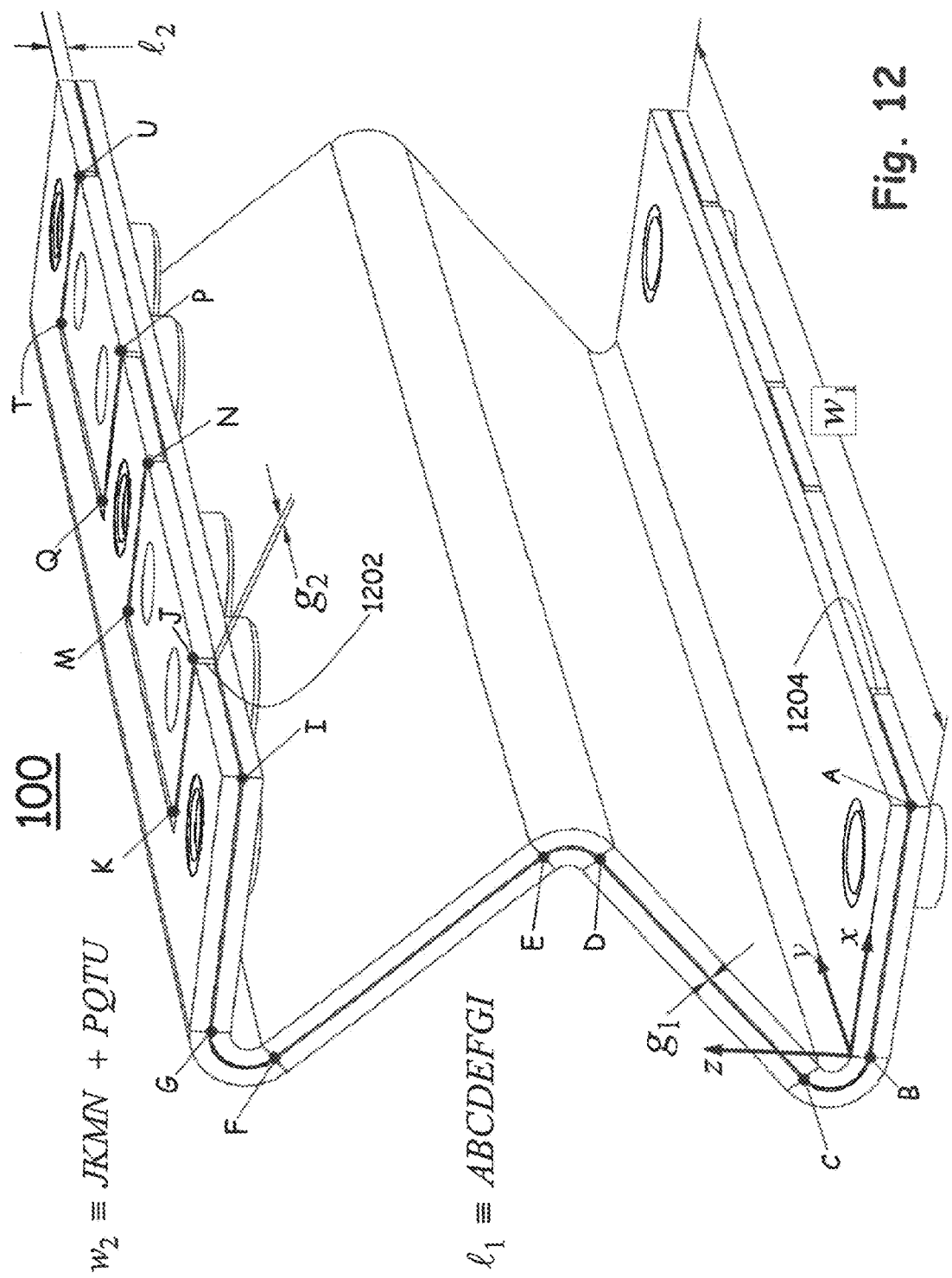
FIG. 12 illustrates the calculation of resistance and inductance for the power connector 100.

Operation of the First Embodiment—FIGS. 12-13

Referring to FIG. 12, the resistance $R_{conn}$ of the connector may be computed. In the anode and in the cathode, either of which may be referred to as an electrode, an electrical current flows along a sigma-shaped current path of length $$l_1 \equiv ABCDEFGI \tag{5}$$

The cross-sectional area through which the current flows is substantially the product of an electrode thickness $l_2$ and an electrode width $w_1$, both of which are assumed to be same for the two electrodes, whence $$R_{conn} \equiv \rho \frac{2l_1}{l_2 w_1}, \tag{6}$$

where $\rho$ is the resistivity of an electrode material assumed to be the same for both electrodes, and the factor of two occurs because the current travels through the anode of length $l_1$ and also through the cathode of length $l_1$.

For example, a prototype of the first embodiment, using copper electrodes ($\rho=1.6\times10^{-5}$ [$\Omega$-mm]), has the following dimensions:

$$l_1=62.5 \text{ [mm]}, l_2=0.8 \text{ [mm]}, w_1=67 \text{ [mm]}, \tag{7}$$

whence $$R_{conn}=37.3 \text{ [}\mu\Omega\text{]} \tag{8}$$

This meets the target resistance specified in equation (4).

The inductance $L_{conn}$ of the connector may be computed using a well-known solution for the self-inductance of parallel plates. Referring to FIG. 13 and a coordinate system 1302 thereon having an x direction, a y direction, and a z direction, all mutually orthogonal, thereby defining an xy plane, this solution states that, for a pair of parallel plates comprising a first parallel plate 1304 and a second parallel plate 1306 lying parallel to each other and parallel to the xy plane, each plate having dimensions $d_x$ and $d_y$ in the x and y directions respectively, with a gap between them of thickness $d_z$, the gap being filled with an insulating material having a magnetic permeability close to the permeability of free space:

$$\mu_0 = 4\pi \times 10^{-10} \left[\frac{H}{mm}\right], \tag{9}$$

and with electrical current I flowing toward the +x direction in plate 1306 and toward the −x direction in plate 1304, the self-inductance of the parallel plates is:

$$L_{PP} = \mu_0 \frac{d_x d_z}{d_y}. \tag{10}$$

Referring again to FIG. 12, equation (10) may be applied to a sigma-shaped path ABCDEFGI to yield a first connector inductance:

$$L_1 = \mu_0 \frac{l_1 g_1}{w_1} \tag{11}$$

where $$l_1 \equiv \text{Length of the sigma-shaped path } ABCDEFGI \tag{12}$$

and $$g_1 \equiv \text{Thickness of the insulator 106.} \tag{13}$$

Equation (10) may be further applied to a first short vertical path 1202 that carries current from the top PCB 802 (FIG. 8) to and from the connector 100, and also to a second short vertical path 1204 that carries current from the bottom PCB 804 (FIG. 8) to and from the connector 100. According to equation (10), each of these paths has an inductance $$L_2 = \mu_0 \frac{l_2 g_2}{w_2} \tag{14}$$

where $$l_2 \equiv \text{Thickness of cathode,} \tag{15}$$

$$g_2 \equiv \text{Gap between flange cathode flange 508 and anode shim plate 402,} \tag{16}$$

and, as shown on FIG. 12, $$w_2 \equiv \text{Combined length of three-sided path } JKMN \text{ and three-sided path } PQTU. \tag{17}$$

Consequently, the self-inductance of the connector 100 is $$L_{conn} \approx L_1 + 2L_2 = \mu_0 \left(\frac{l_1 g_1}{w_1} + 2\frac{l_2 g_2}{w_2}\right) \tag{18}$$

For example, a prototype of the first embodiment has the values $$l_1=62.5 \text{ [mm]}; g_1=0.05 \text{ [mm]}; w_1=67.0 \text{ [mm]}; \tag{19}$$

$$l_2=0.8 \text{ [mm]}; g_1=0.5 \text{ [mm]}; w_1=66.0 \text{ [mm]}; \tag{20}$$

whence, according to equation (11), for the prototype connector, $$L_1 = \mu_0 \frac{l_1 g_1}{w_1} = \tag{21}$$

$$\frac{(4\pi \times 10^{-10} \text{ [H/mm]})(62.5 \text{ [mm]})(0.05 \text{ [mm]})}{(67 \text{ [mm]})} = 58.6 \text{ [pH]};$$

$$L_2 = \tag{22}$$

$$\mu_0 \frac{l_2 g_2}{w_2} = \frac{(4\pi \times 10^{-10} \text{ [H/mm]})(0.8 \text{ [mm]})(0.5 \text{ [mm]})}{(66 \text{ [mm]})} = 7.6 \text{ [pH]}.$$

Consequently, the total self-inductance of the prototype connector is, $$L_{conn} \approx L_1+2L_2=58.6 \text{[pH]}+2(7.6 \text{ [pH]})=73.8 \text{ [pH]}. \tag{23}$$

This meets the target inductance specification in equation (4). In this case, the majority of the inductance in equation

(23) is attributable to the first term $L_1$, which corresponds to the sigma-shaped path ABCDEFGI, rather than to the second term $2L_2$, which corresponds to the short paths 1202 and 1204.

Additional Exemplary Embodiments (FIGS. 14-22)

Second Exemplary Embodiment (Surface Stamps); FIGS. 14-17

Figure 14:
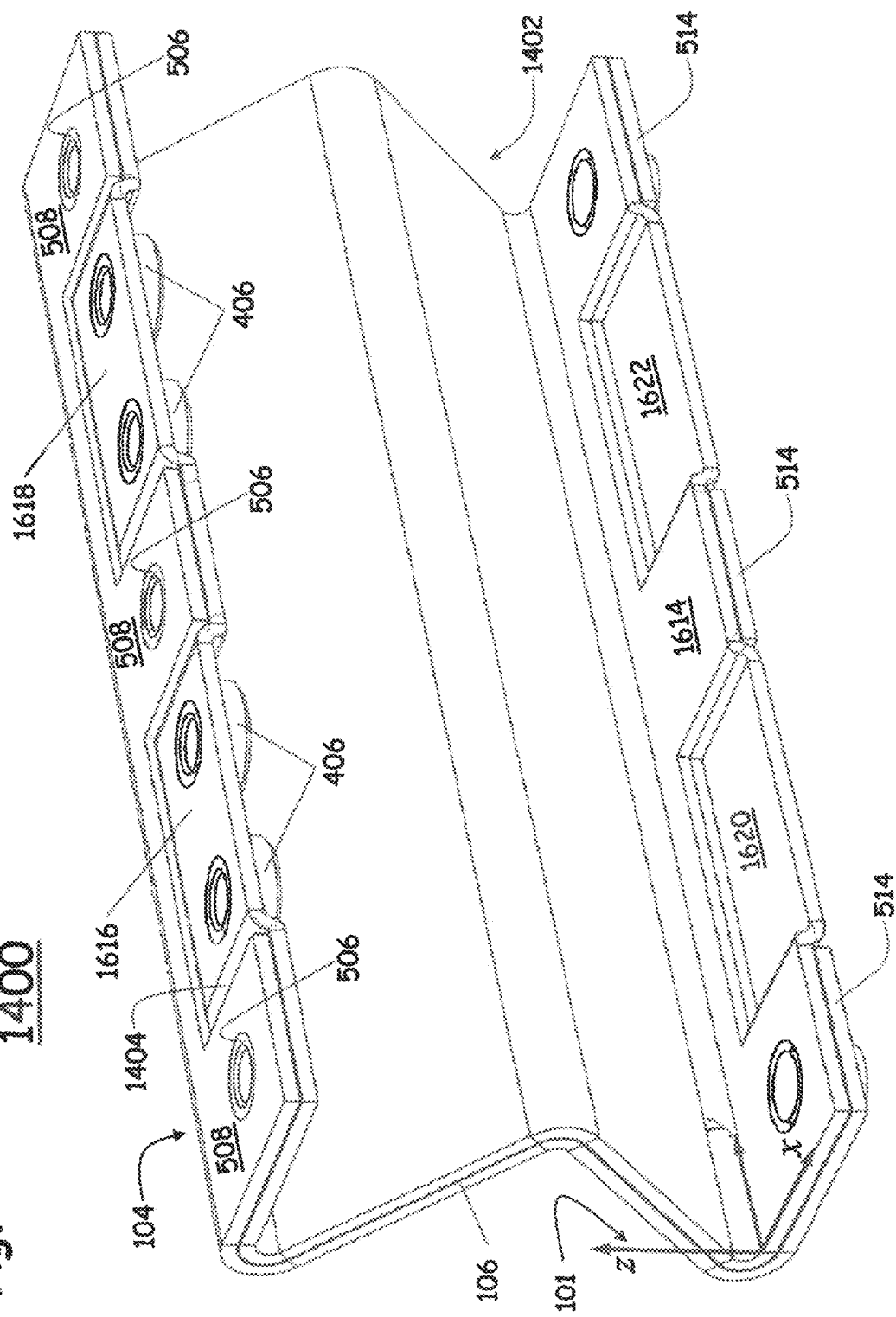
FIG. 14 illustrates a top perspective view of a power connector 1400 according to a second exemplary embodiment.
Figure 15:
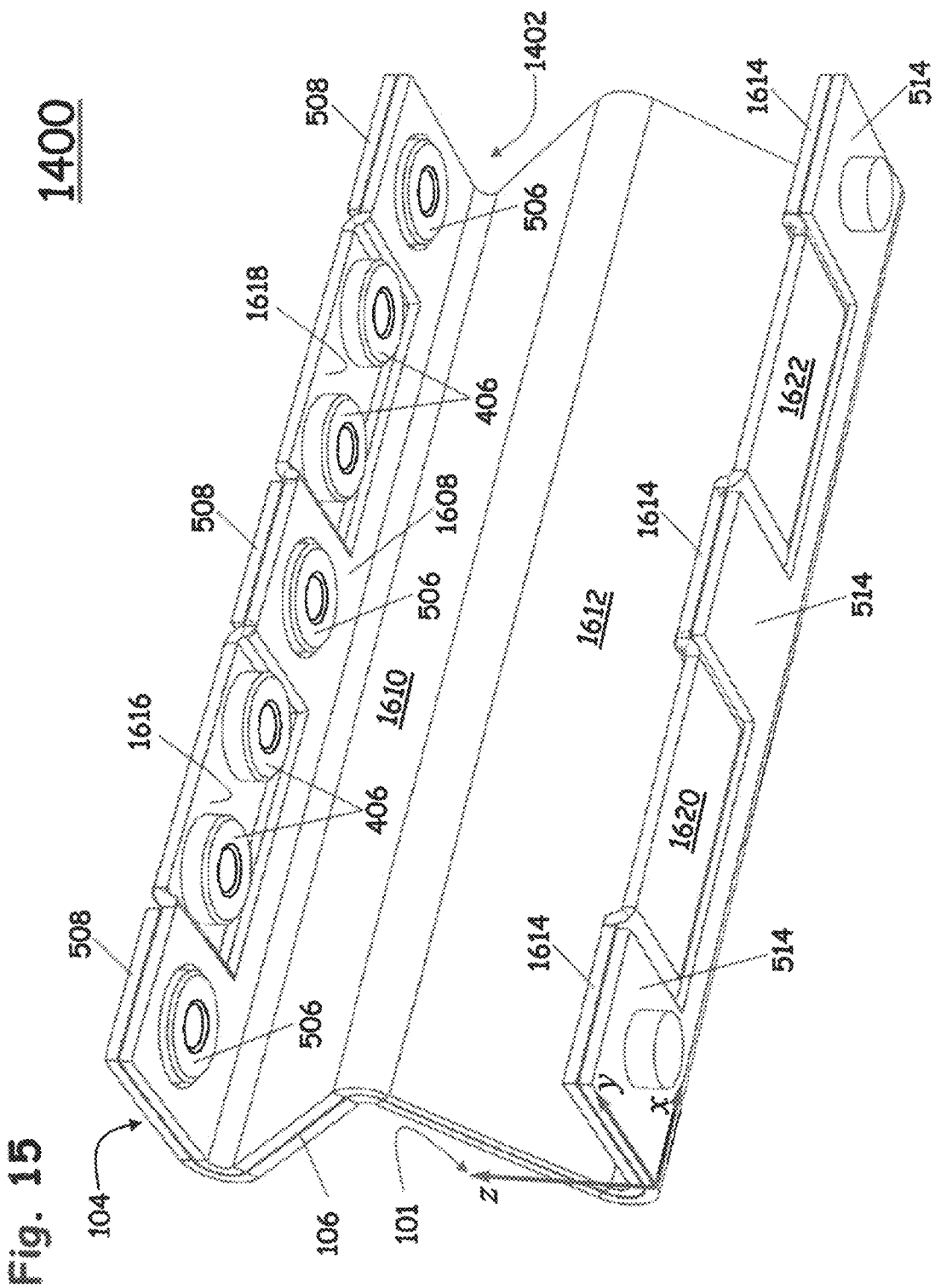
FIG. 15 illustrates a bottom perspective view of the power connector 1400.

FIG. 14 through FIG. 17 illustrate a second exemplary embodiment of a high-current-capacity, low-resistance, low-inductance electrical connector 1400. FIGS. 14 and 15 illustrate assembled views of the connector 1400, which comprises an anode assembly 1402, the cathode assembly 104, and the insulator 106. That is, the second embodiment is distinguished from the first embodiment by the structure of the anode assembly 1402.

Figure 16:
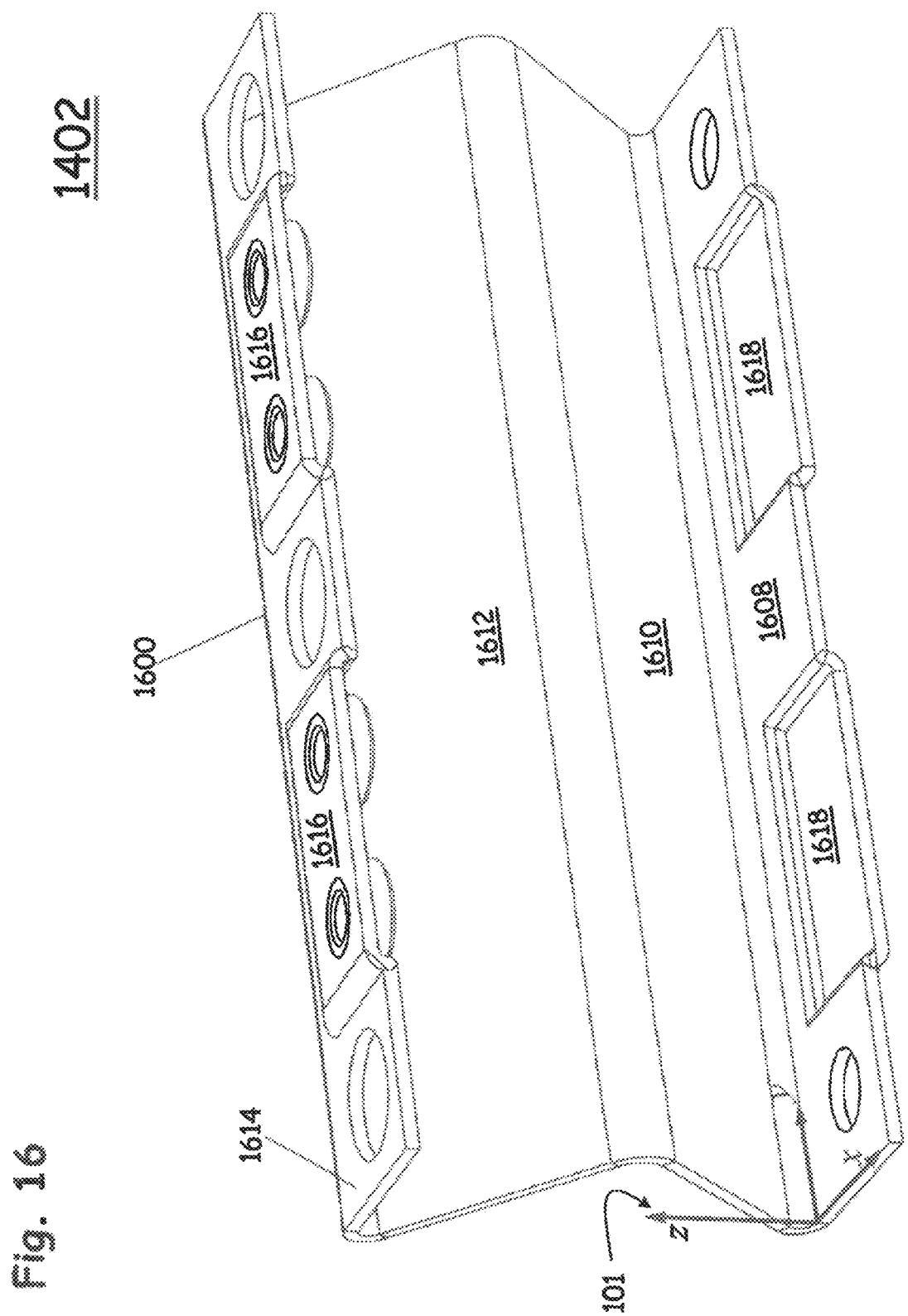
FIG. 16 illustrates an anode assembly 1402 for the connector 1400.
Figure 17:
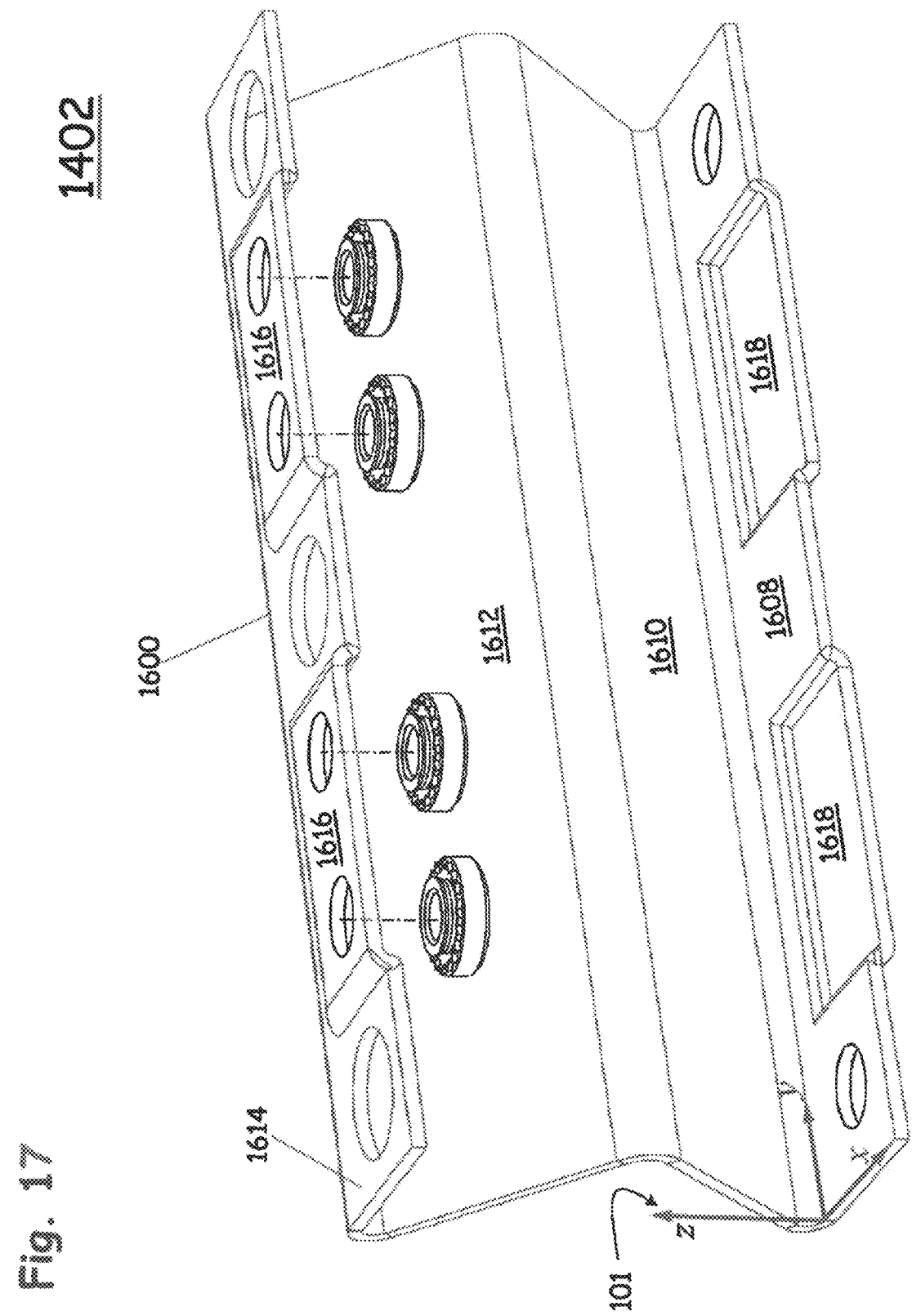
FIG. 17 illustrates an exploded view of the anode assembly 1402.

FIGS. 16 and 17 illustrate unexploded and exploded views of the anode assembly 1402, respectively. The anode assembly 1402 comprises an anode 1600 and a plurality of the fasteners 406. The anode 1600 comprises a bottom flange 1608, a first angled flange 1610, a second angled flange 1612, and a top flange 1614. The anode 1600 of the second embodiment is distinguished from the anode 400 of the first embodiment by at least one top surface stamp 1616 formed from the top flange 1614, and by at least one bottom surface stamp 1618 formed from the bottom flange 1608. Referring to FIG. 14, these top surface stamps 1616 provide, in the second embodiment, what the top shim plates 402 provide in the first embodiment; namely, anode surfaces 1616 that are coplanar with the positive-z-facing surface of cathode flange 514, so that metal pads such as 1006 and 1008 on the top circuit board 802 (FIG. 8) come into contact with both the anode and the cathode simultaneously, by virtue of the coplanar, positive-z-facing surfaces of 514 and 1616.

Likewise, referring to FIG. 15, the bottom surface stamps 1618 provide, in the second embodiment, what the bottom shim plates 404 provide in the first embodiment; namely, anode surfaces that are coplanar with the negative-z-facing surface of cathode flange 508, so that metal pads such as 904 and 906 on the bottom circuit board 804 (FIG. 8) come into contact with both the anode and the cathode simultaneously, by virtue of the coplanar, negative-z-facing surfaces of 508 and 1618.

The advantage of using the surface stamps is that they obviate the need for the shims plates 402 and 404, and the need to attach them, both of which reduce manufacturing cost.

Operation of the second embodiment is similar to that of the first embodiment. The inductance $L_2$ for the second embodiment is likely to be somewhat higher than for the first embodiment, depending on a surface-stamp fabrication technique. That is, referring to FIG. 12, the first embodiment comprises a gap $g_2$ whose value is constant over the length $l_2$, whereas, referring to FIG. 14, the analogous gap for the second embodiment is a gap 1404 whose value varies over the length $l_2$, and is likely to be larger than $g_2$ over most of this length, depending on the fabrication technique.

Consequently, the connector self-inductance $L_{conn}$ for the second embodiment is likely to be higher than for the first embodiment. However, the inductance penalty for using the cost-saving surface stamps is likely to be small: for example, using the prototypical calculations given in equations (19) through (23), even a doubling of $L_2$ changes $L_{conn}$ by only 20.6 percent, because $L_2$ is much less than $L_1$.

Figure 18:
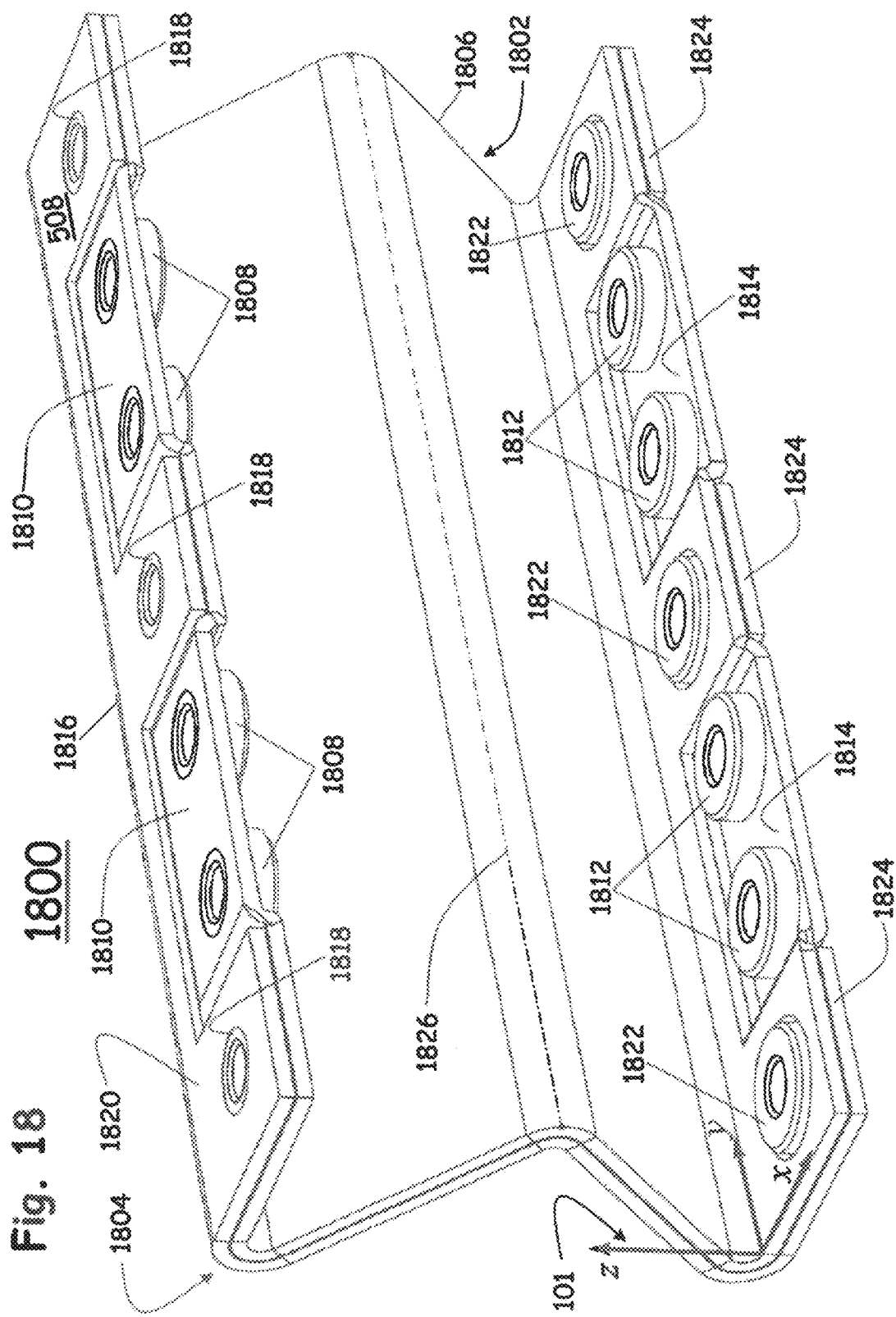
FIG. 18 illustrates a perspective view of a connector assembly 1800 according to a third exemplary embodiment.
Figure 19:
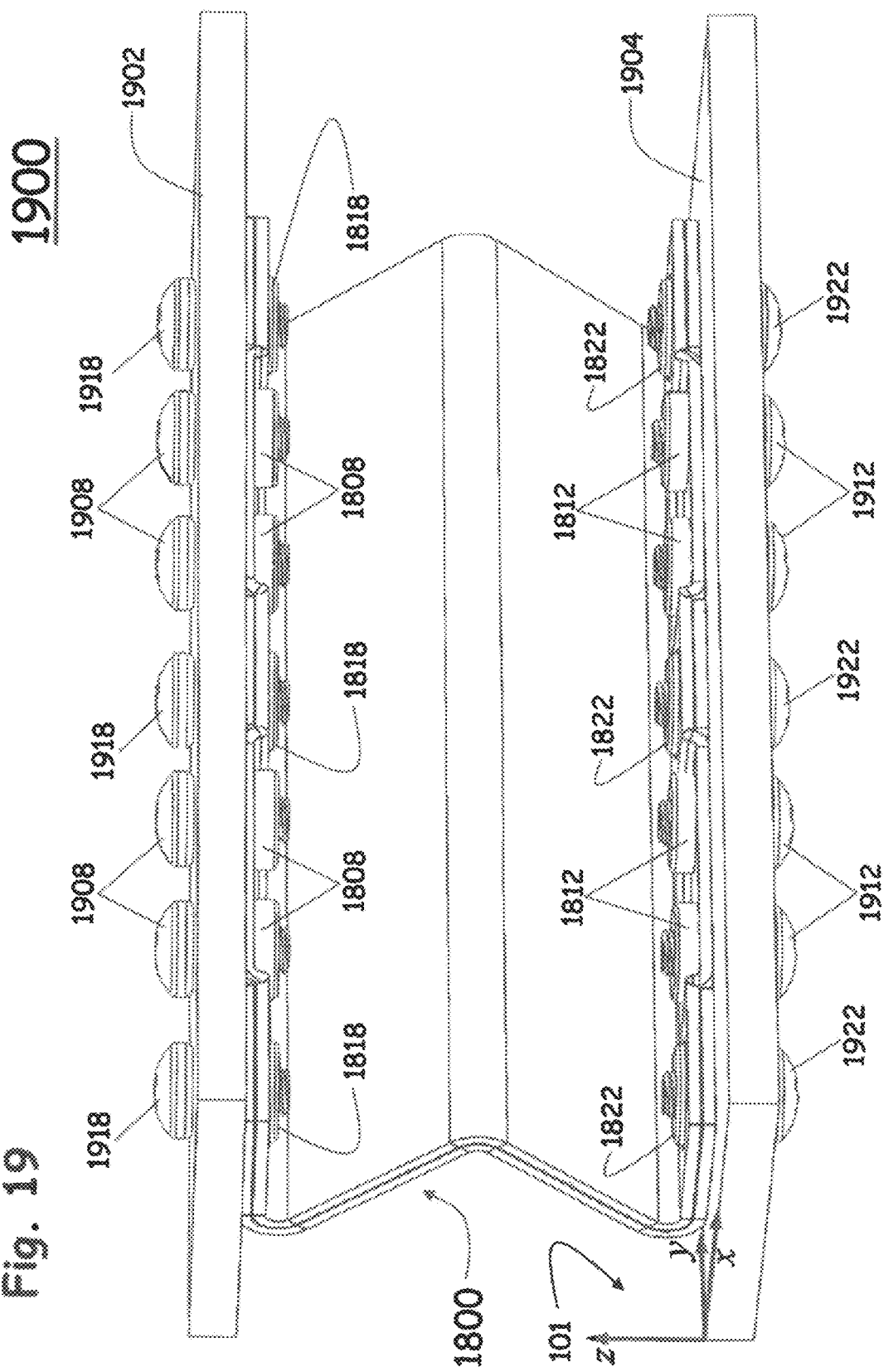
FIG. 19 illustrates a perspective view of an assembly comprising two circuit boards and one instance of the connector 1800.

Third Exemplary Embodiment (Fasteners on Both Sides); FIGS. 18-19

FIGS. 18 and 19 illustrate a third exemplary embodiment of a high-current-capacity, low-resistance, low-inductance, all-fastener-mounted electrical connector 1800. Referring to FIG. 18, the third embodiment is similar to the second embodiment, except that the third embodiment comprises an all-fastener-mounted anode assembly 1802 and an all-fastener-mounted cathode assembly 1804. The all-fastener-mounted anode assembly comprises an all-fastener-mounted anode 1806, at least one female fastener 1808 attached to at least one top surface stamp 1810, and at least one female fastener 1812 attached to at least one bottom surface stamp 1814.

Likewise, the all-fastener-mounted cathode assembly 1804 comprises an all-fastener-mounted cathode 1816, at least one female fastener 1818 attached to a top cathode flange 1820, and at least one female fastener 1822 attached to a bottom cathode flange 1824. Consequently, the connector 1800 may be completely symmetric top to bottom about a plane parallel to the xy plane that is coincident with centerline 1826, although this symmetry is not necessary. That is, a bottom half of the connector 1800 may be, but does not have to be, a mirror image of a top half of the connector 1800.

Referring to FIG. 19, when connector 1800 is used in a board-to-board assembly 1900 to transmit power from a first printed circuit board 1902 to a second printed circuit board 1904, a male fastener 1908 engages each female fastener 1808, a male fastener 1912 engages each female fastener 1812, a male fastener 1918 engages each female fasteners 1818, and a male fastener 1922 engages each female fastener 1822. Engagement of the fasteners 1808 and 1908 connects the anode 1806 to the first PCB 1902; engagement of the fasteners 1812 and 1912 connects the anode 1806 to the second PCB 1904; engagement of the fasters 1818 to 1918 connects the cathode 1816 to the first PCB 1902; and engagement of the fasteners 1822 to 1922 connects the cathode 1816 to the second PCB 1904.

Operation of the third embodiment is similar to that of the first embodiment; however, because the connector 1800 is connected to both the first PCB 1902 and the second PCB 1904 with fasteners, both PCBs can be detached for repair. This is an advantage vis-à-vis the first and second embodiments, which are soldered to the second PCB 804, as shown in FIG. 9. However, the contact resistance associated with mechanical fastening to the second PCB is likely to be higher than the soldered connection thereto, wherein the third embodiment is disadvantaged vis-à-vis the first and second embodiments. Consequently, the choice of the most appropriate embodiment is application specific.

Figure 20:
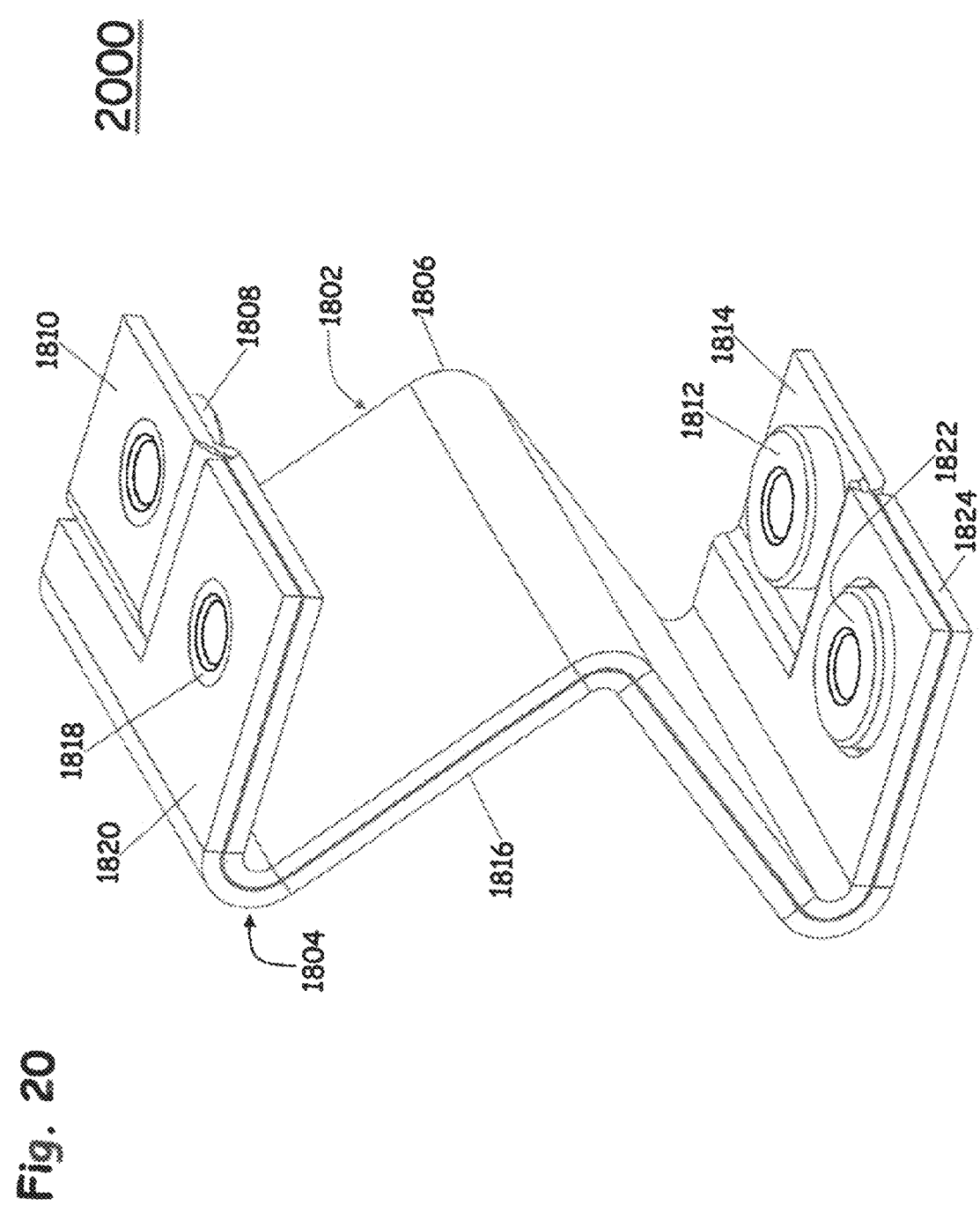
FIG. 20 illustrates a perspective view of a power connector 2000 according to a fourth exemplary embodiment.

Fourth Exemplary Embodiment (Shorter, Fewer Fasteners); FIG. 20

FIG. 20 illustrates a fourth exemplary embodiment of a high-current-capacity, low-resistance, low-inductance connector 2000. It is similar to connector 1800, except that is shorter in the y direction, such that only one instance of the fastener 1808 connects the anode 1806 to the first PCB 1902 (not shown in FIG. 20) at surface stamp 1810, only one instance of the fastener 1812 connects the anode to the bottom PCB 1904 (not shown in FIG. 20) at the surface stamp 1812, only one instance of the fastener 1818 connects the cathode 1816 to PCB 1902 at the top cathode flange 1802, and only one instance of the fastener 1822 connects the cathode 1816 to PCB 1904 at the bottom cathode flange 1824. Operation of the fourth embodiment is similar to the third embodiment, just with fewer fasteners.

Fifth Exemplary Embodiment (Various Shapes); FIGS. 21-22

FIGS. 21A and 21B illustrate a fifth exemplary embodiment of a high-current-capacity, low-resistance, low-inductance connector 2100. It is similar to connector 1800, comprising an electrically conducting anode 2102, an electrically conducting cathode 2104, and an insulating layer 2106 therebetween. The anode comprises a bottom flange 2108, a first angled flange 2110, a second angled flange 2112, and a top flange 2114. Likewise, the cathode comprises a bottom flange 2116, a first angled flange 2118, a second angled flange 2120, and a top flange 2122. The anode comprises at least one bottom surface stamp 2124 in flange 2108, thereby producing a set of bottom-aligned anode and cathode surfaces, such that a first circuit board 2126 may simultaneously make contact with the bottom-aligned surfaces when affixed thereto with fasteners 2132, whereby electrical contact between the first circuit board 2126 and both of the electrodes, anode 2102 and cathode 2104, is established. Likewise, the anode comprises at least one top surface stamp 2128 in flange 2114, thereby producing a set of top-aligned anode and cathode surfaces, such that a second circuit board 2130 may simultaneously make contact with the top-aligned surfaces when affixed thereto with fasteners 2134, whereby electrical contact between the second circuit board 2130 and both of the electrodes, anode 2102 and cathode 2104, is established.

As illustrated on FIG. 21B, let $$\theta_1 \equiv \text{Angle between flange 2108 and flange 2110} \quad (24)$$
$$\equiv \text{Angle between flange 2116 and flange 2118}$$

$$\theta_2 \equiv \text{Angle between flange 2110 and flange 2112} \quad (25)$$
$$\equiv \text{Angle between flange 2118 and flange 2120}$$

$$\theta_3 \equiv \text{Angle between flange 2112 and flange 2114} \quad (26)$$
$$\equiv \text{Angle between flange 2120 and flange 2122}.$$

Also define a board-to-board angle $\theta_{BB}$, which is the angle between circuit boards 2126 and 2130, as $$\theta_{BB} \equiv \text{Angle between flange 2108 and flange 2114} \quad (27)$$
$$\equiv \text{Angle between flange 2116 and flange 2122}.$$

By inspection of FIG. 21B, the board-to-board angle $\theta_{BB}$ is mathematically related to $\theta_1$, $\theta_2$, and $\theta_3$ as follows:

$$\theta_{BB} = \theta_1 + (180° - \theta_2) - (180° - \theta_3) = +\theta_1 + \theta_3 - \theta_2. \quad (28)$$

Previous embodiments have all shown $\theta_1 = \theta_3 = 45°$ and $\theta_2 = 90°$, whence $\theta_{BB} = 0°$. However, by suitable choices of the angles $\theta_1$, $\theta_2$, and $\theta_3$, a variety of connector shapes may be produced to accommodate a variety of applications.

As a first example, consider the case shown in FIG. 22A:

$$\theta_1 = 90°, \theta_2 = 180°, \theta_3 = 180° \Rightarrow \theta_{BB} = 90°. \quad (29)$$

This permits the connection of two circuit boards 2126 and 2130 at right angles. Because of the 180-degree angles, anode flanges 2110, 2112 and 2114 merge into a single flange, as do cathode flanges 2118, 2120, and 2122.

As a second example, consider the case shown in FIG. 22B:

$$\theta_1 = 90°, \theta_2 = 90°, \theta_3 = 90° \Rightarrow \theta_{BB} = 90°. \quad (30)$$

This again produces a right-angle connection between the two circuit boards 2126 and 2130, but with greater compliance than for the case shown in FIG. 22A, because, referring to the coordinate system 101 beneath FIG. 22B, the circuit board 2130 can move slightly in the x and z directions with respect to circuit board 2126 because the connector 2100 can flex about a first corner 2202 and a second corner 2204, respectively.

As a third example, consider the case shown in FIG. 22C:

$$\theta_1 = 90°, \theta_2 = 180°, \theta_3 = 90° \Rightarrow \theta_{BB} = 0°. \quad (31)$$

Like previous embodiments (FIGS. 1-12 and 14-19), this C-shaped connector produces parallel boards ($\theta_{BB} = 0°$). The C shape is a degenerate case of the sigma shape, due to $\theta_2 = 180°$, which causes the two angled flanges to merge into a single vertical flange. Compared to the sigma shape, the C-shape has the advantage of somewhat lower resistance and inductance because of the shorter length $l_1$; see equations (6) and (18). However, compared to the sigma shape, the C shape has low compliance in the z direction vis-à-vis the sigma shape, because the latter can flex at the three corners BC, DE, and FG illustrated in FIG. 7. Consequently, the C shape may be less desirable than the sigma shape for applications that demand compliance, for example, to accommodate mechanical tolerances.

As a fourth example, consider the case shown in FIG. 22D:

$$\theta_1 = 180°, \theta_2 = 180°, \theta_3 = 180° \Rightarrow \theta_{BB} = 180°. \quad (32)$$

This illustrates a low-resistance, low-inductance power connection between two connect circuit boards 2130 and 2126 for applications in which the boards are substantially coplanar.

As a fifth example, consider a case in which a third angled flange 2206 is added to each of the electrodes (anode and cathode). Then a connector such as that shown in FIG. 22E may be constructed. In general, by adding various numbers of flanges at various angles, a great variety of shapes of connectors may be constructed, for a variety of applications, all within the scope of the embodiments specifically detailed herein.

Although the above-described exemplary embodiments described various cross-sectional shapes such as the sigma-shaped curves with relatively abrupt angles, right angles, or zero angle, it should be clear that the present invention is not limited to these cross-sectional shapes since the same principle of operation would apply with less abrupt angles such as semi-circular or other conic cross-sectional shapes.

Thus it can be seen that, in accordance with one or more embodiments, high-current-capacity, low-resistance, low-inductance power connectors may be constructed for a variety of applications in which two electronic entities must be connected and a large, sometimes-fluctuating current passed between them with low loss. One or both entities may be disconnected from the connector, as may be required for servicing. Construction of the connector is straightforward, and manufacturing cost is low.

While the above description contains much specificity, this should not be construed as limitations on the scope, but rather as an exemplification of several embodiments thereof. Many other variations are possible. For example, a connector with no fasteners may be constructed by soldering both terminations thereof. Accordingly, the scope should be determined not by the embodiments illustrated, but by the appended claims and their legal equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electrical connector, comprising:
   an anode for conducting an electrical supply current from a source to a destination, the anode formed into a first shape from sheet metal or other sheet-like conducting material;
   a cathode for conducting an electrical return current from the destination to the source, the cathode formed into a second shape from the sheet metal or other sheet-like conducting material; and
   an insulator that prevents electrical conduction between the anode and the cathode,
   wherein the first and second shapes are such as to provide a conformity of one to the other, with the insulator placed therebetween and having a predetermined relatively thin thickness,
   whereby a predetermined low-resistance path for the supply current is provided by the anode, a predetermined low-resistance path for the return current is provided by the cathode, and a proximity of the anode to the cathode along these paths provides a predetermined low self-inductance of the connector, said proximity being afforded by the conformity of the first and second shapes,
   wherein the anode and the cathode each comprises a plurality of interconnected plate-like sections of the sheet metal or other sheet-like conducting material that are joined together at one or more predetermined angles to form a rigid assembly that accommodates a geometry between the source and the destination.

2. An electrical connector according to claim 1, wherein the one or more predetermined angles comprises at least one of:
   at least one right angle;
   at least one obtuse angle; and
   at least one acute angle.

3. The electrical connector of claim 1, wherein:
   the anode comprises a first anode flange and a second anode flange, with an anode-to-source attachment means being affixed to the first anode flange and an anode-to-destination attachment means being affixed to the second anode flange, and
   the cathode comprises a first cathode flange and a second cathode flange, these flanges being conformal to the anode flanges, with a cathode-to-source attachment means being affixed to the first cathode flange and a cathode-to-destination attachment means being affixed to the second cathode flange, and
   wherein the first and second anode flanges are disposed at an angle with respect to each other to accommodate the geometry between the source and the destination.

4. The electrical connector of claim 3, wherein the source comprises a substantially planar source area to which the connector is attached, and the destination comprises a substantially planar destination area to which the connector is attached, in which context the low self-inductance of the connector is enhanced by providing:
   a. in the first anode flange, at least one source protrusion that protrudes from a surface of the first anode flange by an amount that is substantially equal to a combined thickness of the cathode and the insulator,
   b. in the second anode flange, at least one destination protrusion that protrudes from a surface of the second anode flange by an amount that is substantially equal to the combined thickness of the cathode and the insulator,
   c. in the first cathode flange, a cutout corresponding to each source protrusion that is large enough to allow the source protrusion to nest therein without causing electrical contact between the anode and the cathode, and
   d. in the second cathode flange, a cutout corresponding to each destination protrusion that is large enough to allow the destination protrusion to nest therein without causing electrical contact between the anode and the cathode,
      whereby a surface of the first cathode flange is substantially coplanar with the at least one source protrusion, thereby defining a first set of coplanar surfaces, and a surface of the second cathode flange is substantially coplanar with the at least one destination protrusion, thereby defining a second set of coplanar surfaces, such that an anode-to-source attachment and a cathode-to-source attachment occur by mating the substantially planar source area to the first set of coplanar surfaces using the anode-to-source attachment means and the cathode-to-source attachment means, respectively; and moreover, an anode-to-destination attachment and a cathode-to-destination attachment occur by mating the substantially planar destination area to the second set of coplanar surfaces using the anode-to-destination attachment means and the cathode-to-destination attachment means, respectively.

5. The electrical connector of claim 1, wherein:
   the anode comprises a first anode flange, a second anode flange, a third anode flange, and a fourth anode flange, with an anode-to-source attachment means being affixed to the first anode flange and an anode-to-destination attachment means being affixed to the fourth anode flange, and
   the cathode comprises a first cathode flange, a second cathode flange, a third cathode flange, and a fourth cathode flange, these flanges being conformal to the anode flanges, with a cathode-to-source attachment means being affixed to the first cathode flange and a cathode-to-destination attachment means being affixed to the fourth cathode flange, and
   wherein the first, second, third, and fourth anode flanges are disposed at angles with respect to each other to accommodate the predetermined geometry of the source and the destination.

6. The electrical connector of claim 5, wherein the source comprises a substantially planar source area to which the connector is attached, and the destination comprises a substantially planar destination area to which the connector is attached, in which context the low self-inductance of the connector is enhanced by providing:
  a. in the first anode flange, at least one source protrusion that protrudes from a surface of the first anode flange by an amount that is substantially equal to a combined thickness of the cathode and the insulator,
  b. in the fourth anode flange, at least one destination protrusion that protrudes from a surface of the fourth anode flange by an amount that is substantially equal to the combined thickness of the cathode and the insulator,
  c. in the first cathode flange, a cutout corresponding to each source protrusion that is large enough to allow the source protrusion to nest therein without causing electrical contact between the anode and the cathode, and
  d. in the fourth cathode flange, a cutout corresponding to each destination protrusion that is large enough to allow the destination protrusion to nest therein without causing electrical contact between the anode and the cathode,
    whereby a surface of the first cathode flange is substantially coplanar with the at least one source protrusion, thereby defining a first set of coplanar surfaces, and a surface of the fourth cathode flange is substantially coplanar with the at least one destination protrusion, thereby defining a second set of coplanar surfaces, such that an anode-to-source attachment and a cathode-to-source attachment occur by mating the substantially planar source area to the first set of coplanar surfaces using the anode-to-source attachment means and the cathode-to-source attachment means, respectively; and moreover, an anode-to-destination attachment and a cathode-to-destination attachment occur by mating the substantially planar destination area to the second set of coplanar surfaces using the anode-to-destination attachment means and the cathode-to-destination attachment means, respectively.

7. The electrical connector of claim 1 in which the insulator comprises a coating that is applied to at least one of the anode and the cathode on a set of surfaces where the first and second shapes conform.

8. The electrical connector of claim 1, wherein the anode and the cathode comprise copper or an alloy of copper.

9. The electrical connector of claim 1, wherein:
  the anode further comprises an anode-to-source attachment means and an anode-to-destination attachment means, and
  the cathode further comprises a cathode-to-source attachment means and a cathode-to-destination attachment means,
  such that the connector can be selectively attached to the source using both the anode-to-source attachment means and the cathode-to-source attachment means, and the connector can be selectively attached to the destination using both the anode-to-destination attachment means and the cathode-to-destination attachment means.

10. The electrical connector of claim 9, wherein:
  the anode comprises a first anode flange, a second anode flange, and a third anode flange, with an anode-to-source attachment means being affixed to the first anode flange and an anode-to-destination attachment means being affixed to the third anode flange, and
  the cathode comprises a first cathode flange, a second cathode flange, and a third cathode flange, these flanges being conformal to the anode flanges, with a cathode-to-source attachment means being affixed to the first cathode flange and a cathode-to-destination attachment means being affixed to the third cathode flange, and
  wherein the first, second, and third anode flanges are disposed at angles with respect to each other to accommodate a predetermined geometry of the source and the destination.

11. The electrical connector of claim 10, wherein the source comprises a substantially planar source area to which the connector is attached, and the destination comprises a substantially planar destination area to which the connector is attached, in which context the low self-inductance of the connector is enhanced by providing:
  a. in the first anode flange, at least one source protrusion that protrudes from a surface of the first anode flange by an amount that is substantially equal to a combined thickness of the cathode and the insulator,
  b. in the third anode flange, at least one destination protrusion that protrudes from a surface of the third anode flange by an amount that is substantially equal to the combined thickness of the cathode and the insulator,
  c. in the first cathode flange, a cutout corresponding to each source protrusion that is large enough to allow the source protrusion to nest therein without causing electrical contact between the anode and the cathode, and
  d. in the third cathode flange, a cutout corresponding to each destination protrusion that is large enough to allow the destination protrusion to nest therein without causing electrical contact between the anode and the cathode,
    whereby a surface of the first cathode flange is substantially coplanar with the at least one source protrusion, thereby defining a first set of coplanar surfaces, and a surface of the third cathode flange is substantially coplanar with the at least one destination protrusion, thereby defining a second set of coplanar surfaces, such that an anode-to-source attachment and a cathode-to-source attachment occur by mating the substantially planar source area to the first set of coplanar surfaces using the anode-to-source attachment means and the cathode-to-source attachment means, respectively; and moreover, an anode-to-destination attachment and a cathode-to-destination attachment occur by mating the substantially planar destination area to the second set of coplanar surfaces using the anode-to-destination attachment means and the cathode-to-destination attachment means, respectively.

12. The electrical connector of claim 9, wherein the anode-to-source attachment means, the cathode-to-source attachment means, the anode-to-destination attachment means, and the cathode-to-destination attachment means comprise one of solder and threaded connectors, in any predetermined combination.

13. The electrical connector of claim 9, wherein at least one of the anode-to-source attachment means, the anode-to-destination attachment means, the cathode-to-source attachment means, and the cathode-to-destination attachment means comprises a plurality of instances of attachment fixtures.

14. An electrical connector, comprising:
  an anode assembly for conducting an electrical supply current from a source to a destination, the anode assembly comprising an anode formed into a first shape from sheet metal or other sheet-like conducting material;

a cathode assembly for conducting an electrical return current from the destination to the source, the cathode assembly comprising a cathode formed into a second shape from sheet metal or other sheet-like conducting material; and an insulator that prevents electrical conduction between the anode and the cathode, wherein the first and second shapes are such as to provide a conformity of one to the other, with the insulator therebetween having a predetermined relatively thin thickness, whereby a predetermined low-resistance path for the supply current is provided by the anode, a predetermined low-resistance path for the return current is provided by the cathode, and a proximity of the anode to the cathode along these paths provides a predetermined low self-inductance of the connector, said proximity being afforded by the conformity of the first and second shapes, wherein the anode assembly and the cathode assembly each comprises, interconnected plate-like sections of the sheet metal or other sheet-like conducting material that are joined together at one or more predetermined angles to form a rigid assembly that accommodates a geometry between the source and the destination.

15. The electrical connector of claim 14, wherein the predetermined low-resistance path for the supply current, the predetermined low-resistance path for the return current, and the predetermined low self-inductance provides a method for controlling a power consumption in a high-performance computer system.

\* \* \* \* \*